(12) United States Patent
Lamb et al.

(10) Patent No.: US 9,432,142 B2
(45) Date of Patent: Aug. 30, 2016

(54) PRE-EMPTION IN PASSIVE OPTICAL NETWORKS

(71) Applicant: Broadcom Corporation, Irvine, CA (US)

(72) Inventors: Lowell David Lamb, San Ramon, CA (US); Glen Kramer, Petaluma, CA (US); Patricia Ann Thaler, Carmichael, CA (US); Howard Frazier, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 72 days.

(21) Appl. No.: 14/475,538

(22) Filed: Sep. 2, 2014

(65) Prior Publication Data

US 2015/0063805 A1 Mar. 5, 2015

Related U.S. Application Data

(60) Provisional application No. 61/872,619, filed on Aug. 30, 2013.

(51) Int. Cl.
*H04J 14/08* (2006.01)
*H04B 10/272* (2013.01)
*H04L 12/851* (2013.01)
*H04L 12/28* (2006.01)
*H04Q 11/00* (2006.01)
*H04L 12/863* (2013.01)

(52) U.S. Cl.
CPC ............ *H04J 14/08* (2013.01); *H04B 10/272* (2013.01); *H04L 12/287* (2013.01); *H04L 12/2861* (2013.01); *H04L 12/2885* (2013.01); *H04L 47/245* (2013.01); *H04L 47/2408* (2013.01); *H04L 47/6215* (2013.01); *H04Q 11/0067* (2013.01)

(58) Field of Classification Search
CPC .................................................. H04L 47/2408
See application file for complete search history.

(56) References Cited

U.S. PATENT DOCUMENTS

| | | | | |
|---|---|---|---|---|
| 2007/0127487 A1* | 6/2007 | Kim | ...................... | H04J 3/1694 370/392 |
| 2011/0185052 A1* | 7/2011 | Nakahira | .............. | H04L 41/083 709/223 |
| 2011/0261814 A1* | 10/2011 | Matthews | ........... | H04L 47/6215 370/389 |
| 2012/0106560 A1* | 5/2012 | Gumaste | ................. | H04L 45/04 370/401 |
| 2013/0236185 A1* | 9/2013 | Fang | ................... | H04L 65/1073 398/115 |
| 2013/0251371 A1* | 9/2013 | Goodson | ............ | H04Q 11/0067 398/66 |
| 2015/0016247 A1* | 1/2015 | Hayes | ................... | H04L 47/127 37/230 |

\* cited by examiner

*Primary Examiner* — Nathan Curs
(74) *Attorney, Agent, or Firm* — McDermott Will & Emery LLP

(57) ABSTRACT

A device for pre-emption in passive optical networks may include a first media access control (MAC) module configured to receive a first type of data traffic and transmit the first type of data traffic to a MAC merge module. The device may further include a second media access control (MAC) module configured to receive a second type of data traffic and transmit the second type of data traffic to the MAC merge module. The device may further include the MAC merge module configured to receive the first and second types of data traffic from the first and second MAC modules, respectively, and provide the first and second types of data traffic for transmission over a port. The MAC merge module may be configured to pre-empt the transmission of the first type of data traffic over the port in favor of the second type of data traffic.

20 Claims, 19 Drawing Sheets

PRE-EMPTION IN PASSIVE OPTICAL NETWORKS

CROSS-REFERENCE TO RELATED APPLICATIONS

The present application claims the benefit of U.S. Provisional Patent Application Ser. No. 61/872,619, entitled "Pre-emption in Passive Optical Networks," filed on Aug. 30, 2013, which is hereby incorporated by reference in its entirety for all purposes.

TECHNICAL FIELD

The present description relates generally to passive optical networks (PONs), and more particularly, but not exclusively, to pre-emption in passive optical networks.

BACKGROUND

Passive Optical Networks (PONs), such as Ethernet Passive Optical Networks (EPONs), are increasingly being deployed to satisfy the growth in residential and commercial demand for bandwidth intensive services, e.g. broadband internet access. An EPON generally consists of optical line terminal (OLT) equipment in a central office and multiple optical network units (ONUs) in the field, that are all connected by a passive optical connection. The ONUs may each couple customer equipment of one or more residential or commercial subscribers to the EPON, such that the subscribers may receive bandwidth intensive services, while the OLT equipment may provide flow classification, modification, and quality of service functions for the entire EPON. In one or more implementations, the OLT equipment may be coupled to a backplane or other uplink, such as through an Internet Service Provider (ISP).

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
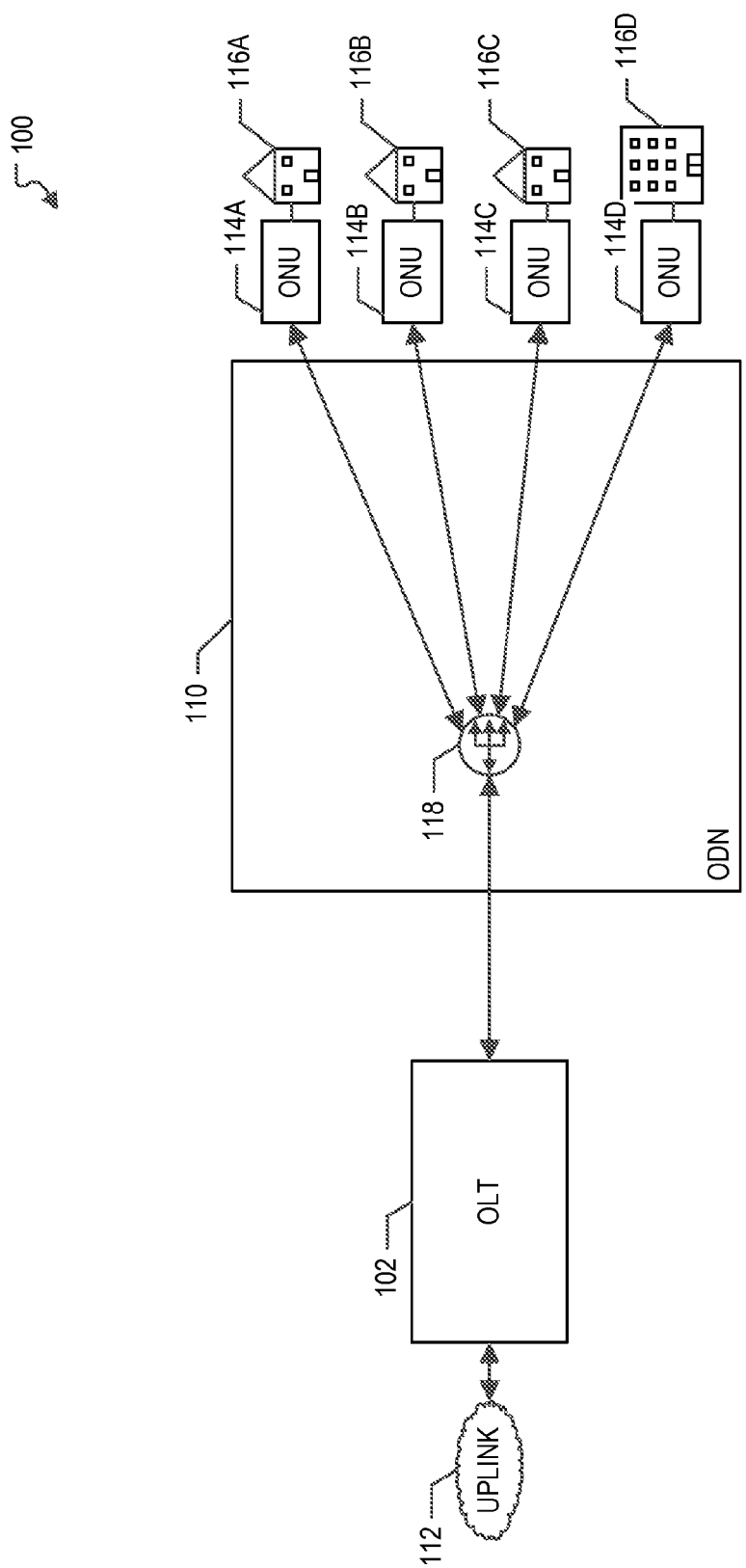
FIG. 1 illustrates an example network environment in which a system for pre-emption in a passive optical network may be implemented in accordance with one or more implementations.

FIG. 1 illustrates an example network environment 100 in which a system for pre-emption in a passive optical network may be implemented in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The network environment 100 includes a passive optical network (PON) environment, such as an Ethernet passive optical network (EPON), a gigabit passive optical network (GPON), or generally any PON. The network environment 100 includes an optical line terminal (OLT) 102, at least one optical distribution network (ODN) 110, one or more optical network units (ONUs) 114A-D, an uplink 112, and one or more customer premises 116A-D. The ODN 110 includes optical fibers, one or more optical splitters 118, such as passive optical splitters, and/or other optical routing devices. The optical splitters 118 split a downstream optical signal such that effectively the same downstream signal is transmitted to each of the ONUs 114A-D. The ODN 110 includes, but is not limited to, any loop-free network topology.

The ONUs 114A-D may be located at, or within a proximity of, e.g. within several miles of, the associated customer premises 116A-D. The ONUs 114A-D may transform incoming optical signals from the OLT 102 into electrical signals that are used by networking and/or computing equipment at the associated customer premises 116A-D. An ONU 114A may service a single customer or multiple customers at the associated customer premises 116A. Since the ONUs 114A-D receive the same downstream signal from the OLT 102, the ONUs 114A-D are each associated with at least one logical link identifier (LLID), such as a 15-bit LLID, that is included in data packets transmitted between the ONUs 114A-D and the OLT 102, such that the ONUs 114A-D can determine whether they are the intended recipients of received data traffic. In one or more implementations, a customer that is receiving service from an ONU 114A may be associated with one or more LLIDs. In this instance, the LLID of the customer may be included in the customer's data traffic that is transmitted to/from the ONU 114A and the OLT 102.

The customer premises 116A-D represent at least a portion of residential and/or commercial properties that are connected to the uplink 112 through the ONUs 114A-D, the ODN 110, and/or the OLT 102. In one or more implementations, a customer premises 116A may include one or more electronic devices, such as laptop or desktop computers, smartphones, personal digital assistants ("PDAs"), portable media players, set-top boxes, tablet computers, televisions or other displays with one or more processors coupled thereto and/or embedded therein, and/or any other devices that include, or are coupled to, a network interface. In one or more implementations, a customer premises 116A may be associated with, and/or may include, networking devices, such as routers, switches, and/or any other networking devices, that may interface with, and/or be communicatively coupled to, the associated ONU 114A. In one or more implementations, one or more of the networking devices associated with a customer premises 116A may interface with the associated ONU 114A external to the customer premises 116A, such as several miles from the customer premises 116A. In this instance, the networking devices may be connected to the customer premises 116A via, e.g, copper technologies, such as wired Ethernet.

In one or more implementations, the uplink 112 may be a public communication network (such as the Internet, cellular data network, dialup modems over a telephone network) or a private communications network (such as private local area network ("LAN"), leased lines). The uplink 112 may also include, but is not limited to, any one or more of the following network topologies, including a bus network, a star network, a ring network, a mesh network, a star-bus network, a tree or hierarchical network, and the like. In one or more implementations, the uplink 112 may be connected to the OLT 102 via a network-to-network interface (NNI).

The OLT 102 may be located in a central office, such as a central office of a service provider. The OLT 102 provides an interface between the ONUs 114A-D and the uplink 112, such as by transforming between the optical signals used by the ONUs 114A-D and the electrical signals used by the uplink 112. The OLT 102 may support multiple upstream and downstream data rates, such as 1 gigabit per second (1 G), 10 gigabits per second (10 G), and/or any other transmission rates. The OLT 102 may include one or more PON ports that may transmit data to, and receive data from, one or more ONUs 114A-D at one of the data rates supported by the OLT 102, such as 1 Gbit/s (1 G), 10 Gbit/s (10 G), etc. In one or more implementations, the OLT 102 and/or one or more of the ONUs 114A-D may support any Ethernet-based PON system and/or any bit rate, such as 1 G, 10 G, and higher.

In one or more implementations, the subject technology may be implemented at the OLT 102. For example, the OLT 102 may include several Medium Access Control modules, e.g. at least one for each of the ONUs 114A-D and/or for each assigned LLID. The OLT 102 may further include a multipoint MAC control module that determines which of the MAC modules may transmit data traffic onto the ODN 110 at any given time, e.g. to avoid collisions. Thus, the MAC modules may take turns transmitting data traffic onto the ODN 110 and to the ONUs 114A-D, as coordinated by the multipoint MAC control module.

In one or more implementations, each of the MAC modules associated with each of the ONUs 114A-D and/or LLIDs, may be split into two separate modules, e.g. physically or logically. The first MAC module may transmit express data traffic over the ODN 110 to the associated ONU 114A, while the second MAC module may transmit non-critical data traffic over the ODN 110 to the associated ONU 114A. In one or more implementations, express data traffic may be any data traffic that is associated with high sensitivity to delay or latency. In one or more implementations, the first and second MAC modules associated with each of the ONUs 114A-D and/or LLIDs, may be communicatively coupled to MAC merge modules that arbitrate the transmission of the express and non-critical data traffic by the first and second MAC modules. In one or more implementations, one or more of the MAC merge modules may pre-empt the transmission of the non-critical data traffic in favor of the express data traffic.

In one or more implementations, when one of the MAC modules receives express data traffic to be transmitted over the ODN 110, a hold request signal may be transmitted to the MAC merge modules, such as by the multipoint MAC control module. In one or more implementations, the multipoint MAC control module may estimate an amount of time required to transmit the express data traffic, and may transmit an amount of time that each of the MAC merge modules should hold non-critical data traffic along with the hold request signal. The MAC merge modules may stop accepting non-critical and/or express data traffic for transmission in response to receiving the hold request signal. In one or more implementations, the MAC merge modules may only stop accepting non-critical traffic in response to receiving the hold request signal. In one or more implementations, one or more of the MAC merge modules may utilize frame segmentation to terminate any non-critical and/or express data traffic being transmitted, e.g. mid-frame, at the time that the hold request signal is received. The detected express data traffic may then be transmitted over the PON port onto the ODN 110. Upon completing transmission of the express data traffic, a release request signal may be transmitted to the MAC merge modules, such as by the multipoint MAC control module. The MAC merge modules may resume accepting non-critical and/or express data traffic in response to receiving the release request signal.

In one or more implementations, the express data traffic may be transmitted on a scheduled basis that is known to the multipoint MAC control module. Thus, the multipoint MAC control module may transmit a signal to each of the MAC merge modules that indicates that any non-critical data traffic should be held when the multipoint MAC control module anticipates, or expects, express data traffic to be transmitted. The multipoint MAC control module may indicate an amount of time that the non-critical data traffic should be held, e.g. based at least in part on an estimated amount of time required to transmit the express data traffic. In one or more implementations, the MAC merge module that is transmitting the express data traffic may signal to the multipoint MAC control module when the transmission of the express data traffic has completed. The multipoint MAC control module may then signal to the other MAC merge modules that the non-critical data traffic may resume. If any of the MAC merge modules had paused, or stopped, any non-critical data traffic mid-frame, e.g. in order for the express data traffic to be transmitted, the MAC merge module may utilize frame segmentation techniques to resume transmission and transmit the remaining portion of the frame.

In one or more implementations, the subject technology may also be implemented in a similar manner at one or more of the ONUs 114A-D. In addition to allowing the ONUs 114A-D to prioritize delay sensitive data traffic, the subject technology may also allow the ONUs 114A-D to transmit a portion of a frame in one grant and the remainder of the frame in the next grant. For example, the ONUs 114A-D may suspend transmission of a frame at the end of a first grant and may resume transmission of the frame at the start of the next grant.

In one or more implementations, the ONU 114A may determine that an entire frame cannot be sent during the remainder of the current grant. In this instance, the ONU 114A may transmit a first portion of the frame during the current grant, e.g. the amount of the frame that can be transmitted during the current grant. The ONU 114A may use frame segmentation techniques to terminate the frame transmission, and then transmit a report frame (or packet) for the grant. In one or more implementations, the ONU 114A may not transmit the report frame for the grant. When the next grant begins for the ONU 114A, the ONU 114A may transmit the remaining portion of the frame, e.g. using frame segmentation techniques or other suitable techniques.

Thus, the subject technology allows delay sensitive data traffic to be protected by preempting lower priority data traffic both in the downstream direction, e.g. at the OLT 102, and in the upstream direction, e.g. at the ONUs 114A-D. Furthermore, the subject technology allows one or more of the ONUs 114A-D to transmit a first portion of a frame in one grant, and the remaining portion of the frame in the next grant, e.g. irrespective of the amount of time between the grants.

Figure 2:
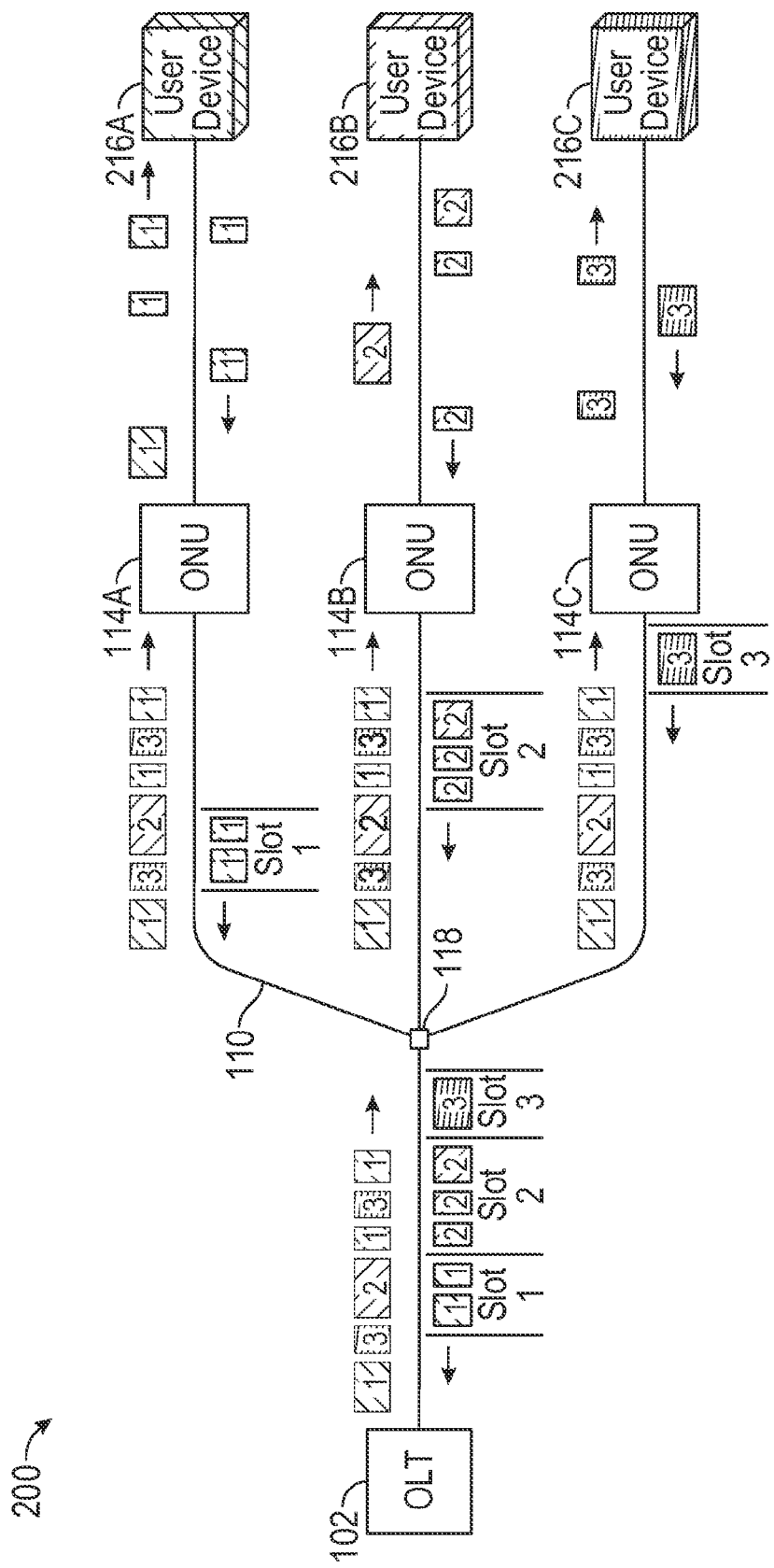
FIG. 2 illustrates an example data traffic flow in a system for pre-emption in a passive optical network in accordance with one or more implementations.

FIG. 2 illustrates an example data traffic flow 200 in a system for pre-emption in a passive optical network in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The data traffic flow 200 includes the OLT 102, the ODN 110, the optical splitter 118, the ONUs 114A-C, and user devices 216A-C. The user devices 216A-C may be any electronic devices that are communicatively coupled to the ONUs 114A-C, such as in conjunction with the customer premises 116A-C. The data traffic flow 200 illustrates that data traffic transmitted by the OLT 102 onto the ODN 110 is received by each of the ONUs 114A-C coupled to the ODN 110. Thus, the ONU 114A may receive all of the data traffic that is transmitted by the OLT 102, and the ONU 114A may determine whether the received data traffic is intended for the ONU 114A and/or the associated user device 216A, such as based at least in part on the LLID contained in the data traffic. The ONU 114A may process the data traffic that is intended for the ONU 114A and/or the associated user device 216A, and may drop the data traffic that is not intended for the ONU 114A and/or the associated user device 216A.

The data traffic flow 200 further illustrates a time division multiplexing scheme that is implemented in the upstream direction, e.g. from the ONUs 114A-C to the OLT 102. In the data traffic flow 200, a first time slot is assigned and/or granted to the ONU 114A and/or an LLID serviced by the ONU 114A, a second time slot is assigned and/or granted to the ONU 114B and/or an LLID serviced by the ONU 114B, and a third time slot is assigned and/or granted to the ONU 114C and/or an LLID serviced by the ONU 114C. Thus, the ONU 114A transmits upstream data traffic onto the ODN 110 during the first time slot, the ONU 114B transmits upstream data traffic onto the ODN 110 during the second time slot, and the ONU 114C transmits upstream data traffic onto the ODN 110 during the third time slot, thereby preventing any collisions between the upstream data traffic transmitted by the ONUS 114A-C. In one or more implementations, the time slots may be assigned and/or granted by the OLT 102. In one or more implementations, a single transmitter at the OLT 102 may continuously transmit data and/or idles.

Figure 3:
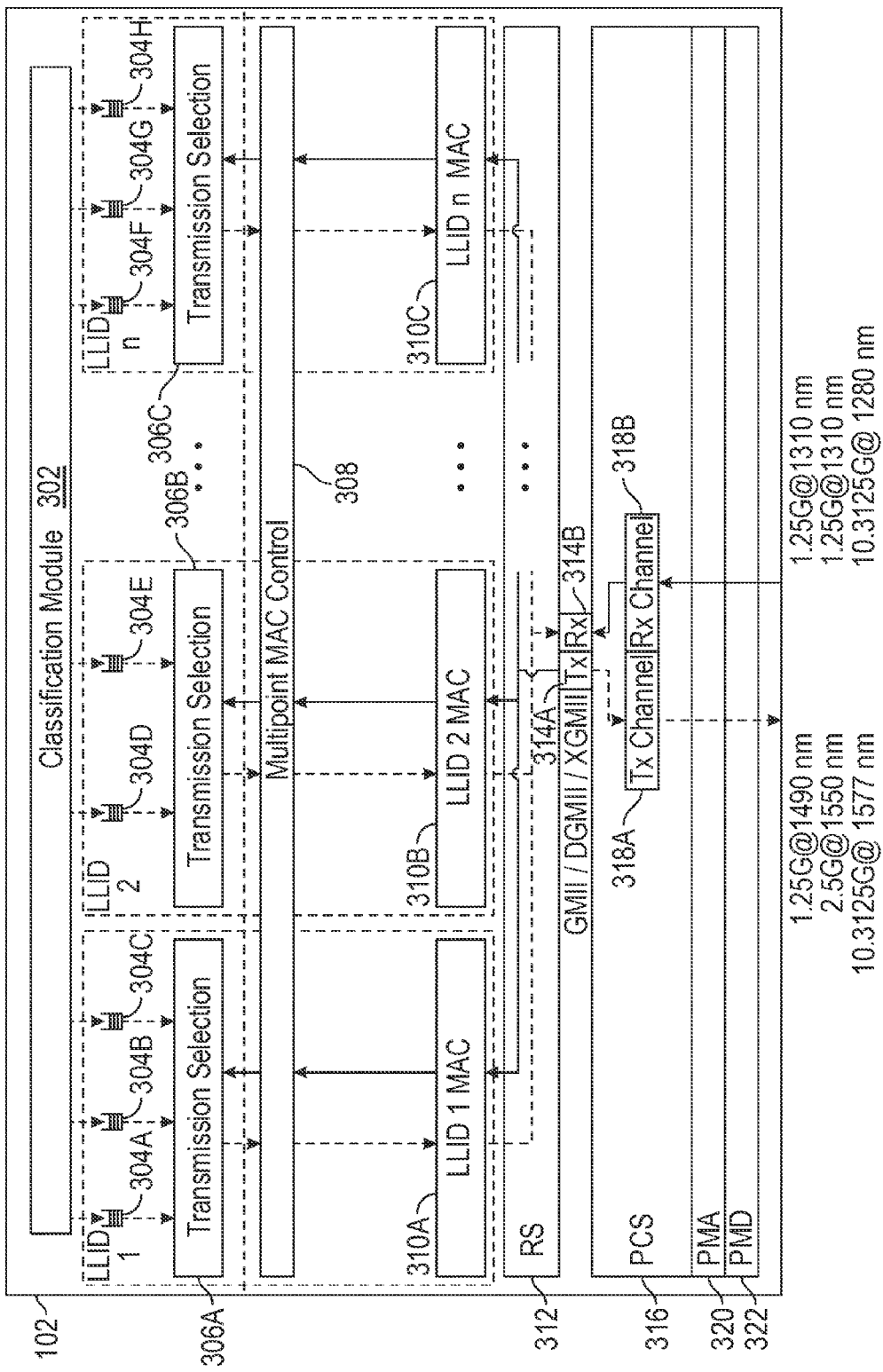
FIG. 3 illustrates an example OLT.

FIG. 3 illustrates an example OLT 102. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The example OLT 102 may include a classification module 302, one or more queues 304A-H, one or more transmission selection modules 306A-C, a multipoint MAC control module 308, one or more MAC modules 310A-C, a reconciliation sublayer (RS) 312, a transmit interface 314A, a receive interface 314B, a physical coding sublayer (PCS) 316, a physical medium attachment (PMA) sublayer 320, and a physical medium dependent sublayer (PMD) 322. The PCS 316 may include a transmit channel 318A, and a receive channel 318B. In one or more implementations, the PMD sublayer 322 may include and/or may be communicatively coupled to a port, such as a PON port, that interfaces with the ODN 110. In one or more implementations, the transmit and receive interfaces 314A-B may be, for example, media independent interfaces, such as GMII, DGMII, XGMII, etc., and may couple the PCS 316 and the RS 312. As shown in FIG. 3, the queues 304A-H, the transmission selection modules 306A-C, and the MAC modules 310A-C may each be associated with an LLID, e.g. LLID 1, LLID 2 . . . LLID n.

In operation, the classification module 302 queues frames into the queues 304A-H. The transmission selection modules 306A-C select frames from the queues 304A-H for transmission. The multipoint MAC control module 308 provides control functionality across the MAC modules 310A-C, such as by arbitrating transmission of frames by the MAC modules 310A-C. The MAC modules 310A-C receive frames and transmit the frames to the lower layers for transmission out the PON port and over the ODN 110. In one or more implementations, the transmitted frames may include both non-critical and express data traffic. However, the OLT 102 of FIG. 3 may be unable to rapidly pre-empt the non-critical data traffic in favor of the express data traffic.

In one or more implementations, one or more of the classification module 302, the transmission selection modules 306A-C, the queues 304A-H, the multipoint MAC control module 308, the MAC modules 310A-C, the transmit interface 314A, the receive interface 314B, the RS 312, the PCS 316, the PMA sublayer 320, the PMD sublayer 322, the transmit channel 318A, and/or the receive channel 318B may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
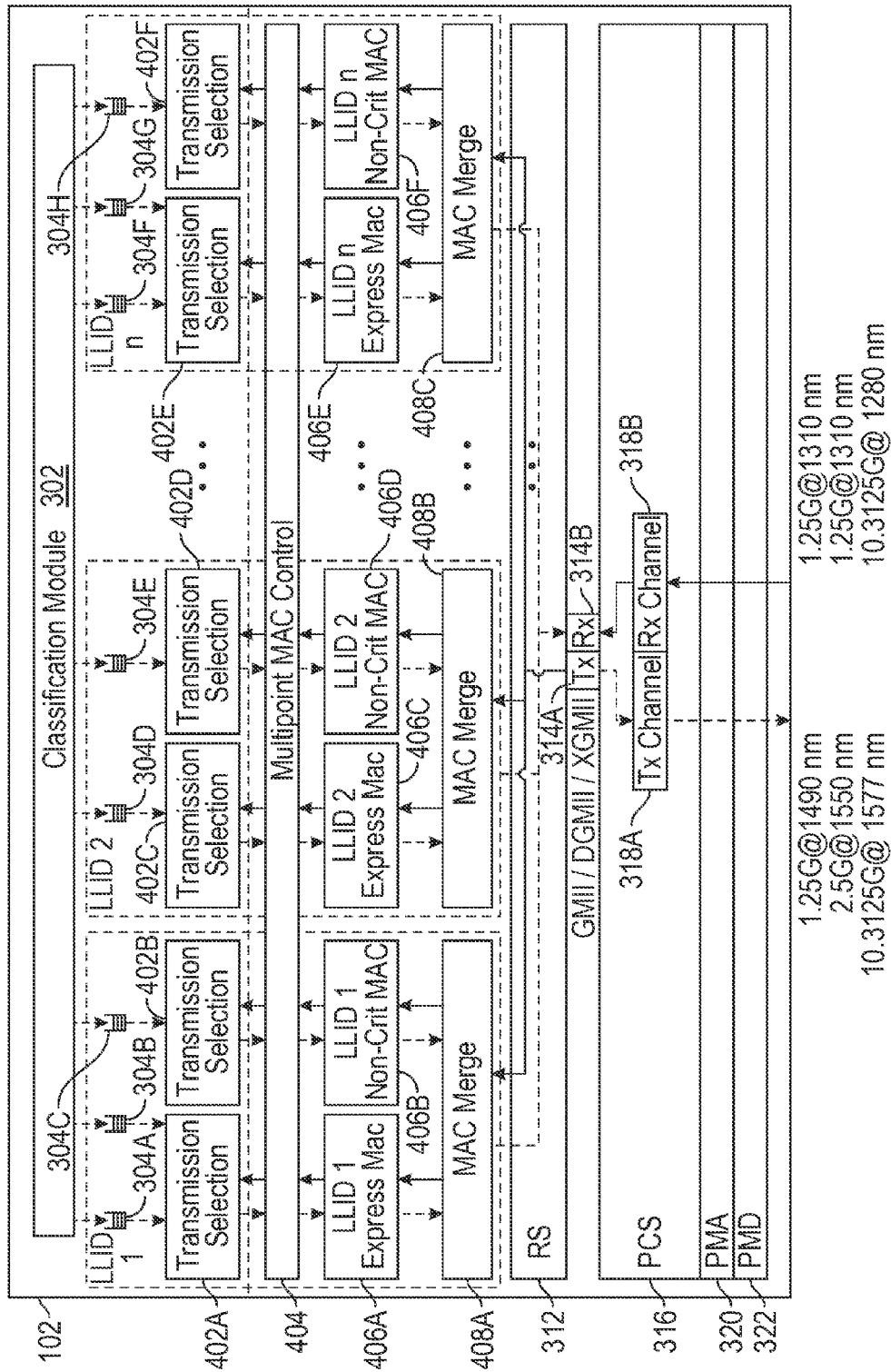
FIG. 4 illustrates an example OLT in a system for pre-emption in a passive optical network in accordance with one or more implementations.

FIG. 4 illustrates an example OLT 102 in a system for pre-emption in a passive optical network in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The example OLT 102 may include a classification module 302, one or more queues 304A-H, one or more transmission selection modules 402A-F, a multipoint MAC control module 404, one or more MAC modules 406A-F that are each associated with an LLID and a type of data traffic, one or more MAC merge modules 408A-C that are each associated with an LLID, an RS 312, a transmit interface 314A, a receive interface 314B, a PCS 316, a PMA sublayer 320, and a PMD sublayer 322. The PCS 316 may include a transmit channel 318A, and a receive channel 318B. In one or more implementations, the PMD sublayer 322 may include and/or may be communicatively coupled to a port, such as a PON port, that interfaces with the ODN 110. As shown in FIG. 4, the queues 304A-H, the transmission selection modules 402A-F, the MAC modules 406A-F, and the MAC merge modules 408A-C may each be associated with an LLID, e.g. LLID 1, LLID 2 . . . LLID n.

The MAC modules 406A,C,E may be associated with a first type of data traffic, such as express data traffic, and may be referred to, in one or more implementations, as express MAC modules 406A,C,E. The MAC modules 406B,D,F may be associated with a second type of data traffic, such as non-critical data traffic, and may be referred to, in one or more implementations, as non-critical MAC modules 406B, D,F. In one or more implementations, one or more of the MAC modules 406A-F may be physically separate modules and/or one or more of the MAC modules 406A-F may be logically separated modules. In one or more implementations, the MAC modules 406A-F may be associated with any type of data traffic, such as a data traffic type characterized by content, a data traffic type characterized by quality of service, or any type of data traffic that is characterizable.

In one or more implementations, the transmission selection modules 402A,C,E may be associated with, and/or may select, exclusively a first type of data traffic from the associated queues 304A-H, such as express data traffic and the transmission selection modules 402B,D,F may be associated with, and/or may exclusively select, a second type of data traffic from the associated queues 304A-H, such as non-critical data traffic. In one or more implementations, the selection modules 402A-F may each select express data traffic and/or non-critical data traffic from the associated queues 304A-H.

In operation, the classification module 302 queues frames into the queues 304A-H. The transmission selection modules 402A-F select non-critical and/or express frames from the queues 304A-H for transmission by the associated MAC modules 406A-F. The multipoint MAC control module 404 provides control functionality across the MAC modules 406A-F. The non-critical MAC modules 406B,D,F may receive non-critical frames and transmit the non-critical frames to the MAC merge modules 408A-C. The MAC merge modules 408A-C may arbitrate the transmission of frames by the MAC modules 406A-F, and may forward received frames to the lower layers for transmission over the ODN 110.

If express data traffic is detected, such as by the multipoint MAC control module 404 and/or one or more of the express MAC modules 406A,C,E, such as the express MAC module 406A, the transmission of the non-critical data traffic by one or more of the non-critical MAC modules 406B,D,F may be stopped such that the express data traffic may be transmitted by the express MAC module 406A. Once the transmission of the express data traffic has completed, the non-critical MAC modules 406B,D,F may resume transmission of the non-critical data traffic. In one or more implementations, one or more of the non-critical MAC modules 406B,D,F may utilize frame segmentation techniques to transmit a portion of a frame prior to stopping the transmission of the non-critical data traffic and transmitting the remaining portion of the frame after resuming the transmission of the non-critical data traffic. In one or more implementations, the express MAC modules 406C,E may also stop the transmission of express traffic to allow the MAC module 406A to transmit express traffic.

In one or more implementations, one or more of the transmission selection modules 402A-F, the MAC modules 406A-F, and/or the MAC merge modules 408A-C may be implemented in software (e.g., subroutines and code) and/or hardware (e.g., an ASIC, a FPGA, a PLD, a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

In one or more implementations, one or more of the depicted components may share circuitry, such as a cyclic redundancy check (CRC) generator. Thus, when a frame is preempted any state associated with the preempted frame would be saved, e.g. the current value of the CRC computation, while the circuitry performs the operations for each express frame transmitted. The saved state may then be loaded into the shared circuitry before resuming transmission of the preempted frame.

Figure 5:
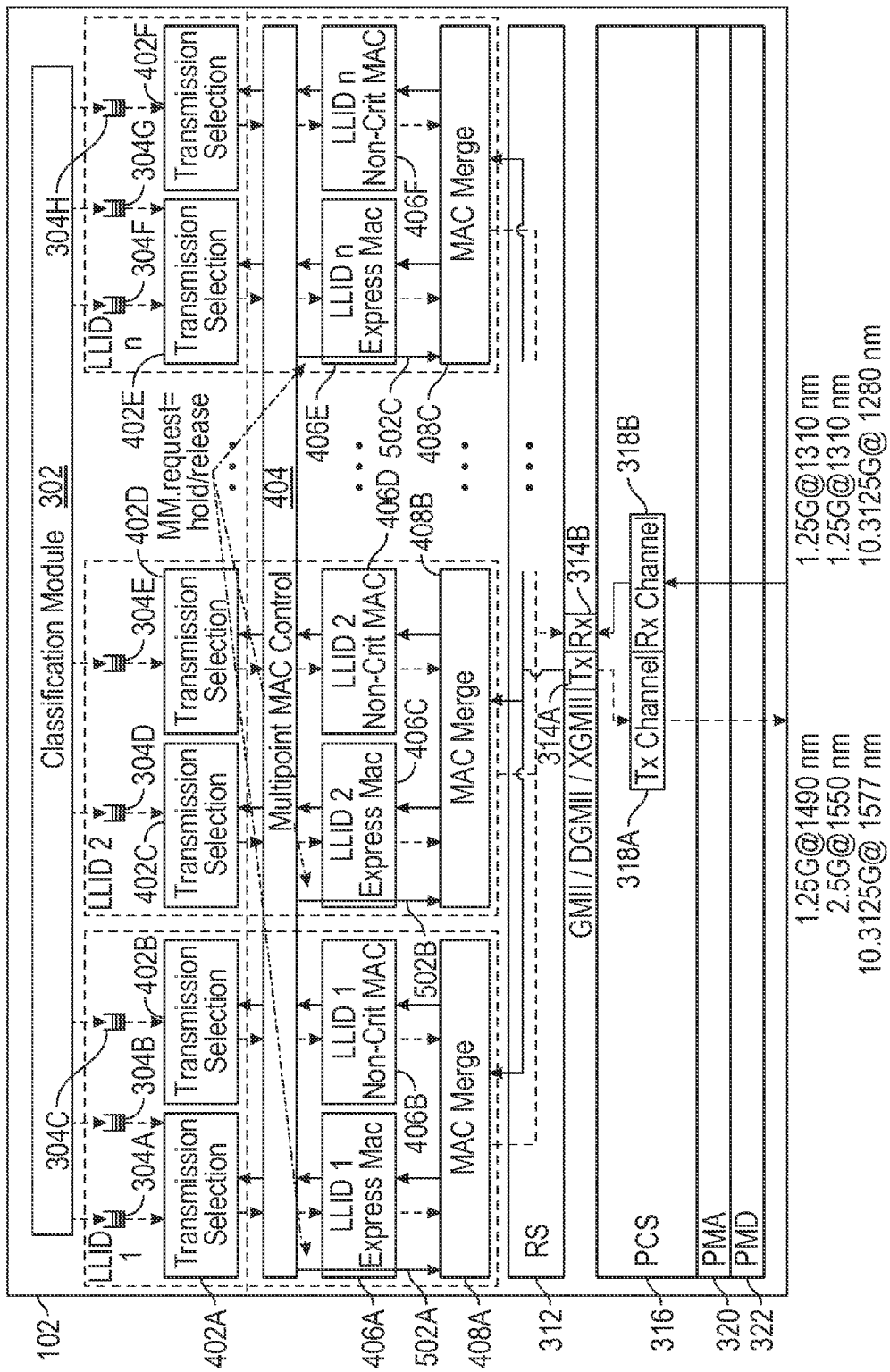
FIG. 5 illustrates an example OLT in a system for pre-emption in a passive optical network in accordance with one or more implementations.

FIG. 5 illustrates an example OLT 102 in a system for pre-emption in a passive optical network in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The example OLT 102 includes a classification module 302, one or more queues 304A-H, one or more transmission selection modules 402A-F, a multipoint MAC control module 404, one or more MAC modules 406A-F that are each associated with an LLID and a type of data traffic, one or more MAC merge modules 408A-C that are each associated with an LLID, an RS 312, a transmit interface 314A, a receive interface 314B, a PCS 316, a PMA sublayer 320, and a PMD sublayer 322. The PCS 316 may include a transmit channel 318A, and a receive channel 318B. In one or more implementations, the PMD sublayer 322 may include and/or may be communicatively coupled to a port, such as a PON port, that interfaces with the ODN 110. As shown in FIG. 4, the queues 304A-H, the transmission selection modules 402A-F, the MAC modules 406A-F, the signaling mechanisms 502A-C, and the MAC merge modules 408A-C may each be associated with an LLID, e.g. LLID 1, LLID 2 . . . LLID n.

The example OLT 102 of FIG. 5 further includes signaling mechanisms 502A-C that allows the multipoint MAC control module 404 to transmit hold requests and/or release requests to the MAC merge modules 408A-C. In one or more implementations, the multipoint MAC control module 404 may transmit the hold request via the signaling mechanisms 502A-C to the MAC merge modules 408A-C upon detecting the presence of express data traffic for transmission by one or more of the express MAC modules 406A,C,E and/or upon anticipating the transmission of express data traffic by one or more of the express MAC modules 406,A,C,E, such as based on a known transmission schedule for express data traffic. In one or more implementations, the hold requests may further include a duration of time associated with the transmission of the express data traffic. In one or more implementations, the multipoint MAC control module 404 may transmit the release request via the signaling mechanisms 502A-C to the MAC merge modules 408A-C upon determining that the transmission of the express data traffic has completed.

In one or more implementations, the signaling mechanisms 502A-C may be a hardwired connection and/or an out-of-band connection between the multipoint MAC control module 404 and the MAC merge modules 408A-C. In one or more implementations, the signaling mechanisms 502A-C may be, and/or may include, the express data traffic paths via the express MAC modules 406A,C,E. In one or more implementations, one or more of the signaling mechanisms 502A-C may be implemented in software (e.g., subroutines and code) and/or hardware (e.g., an ASIC, a FPGA, a PLD, a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 6:
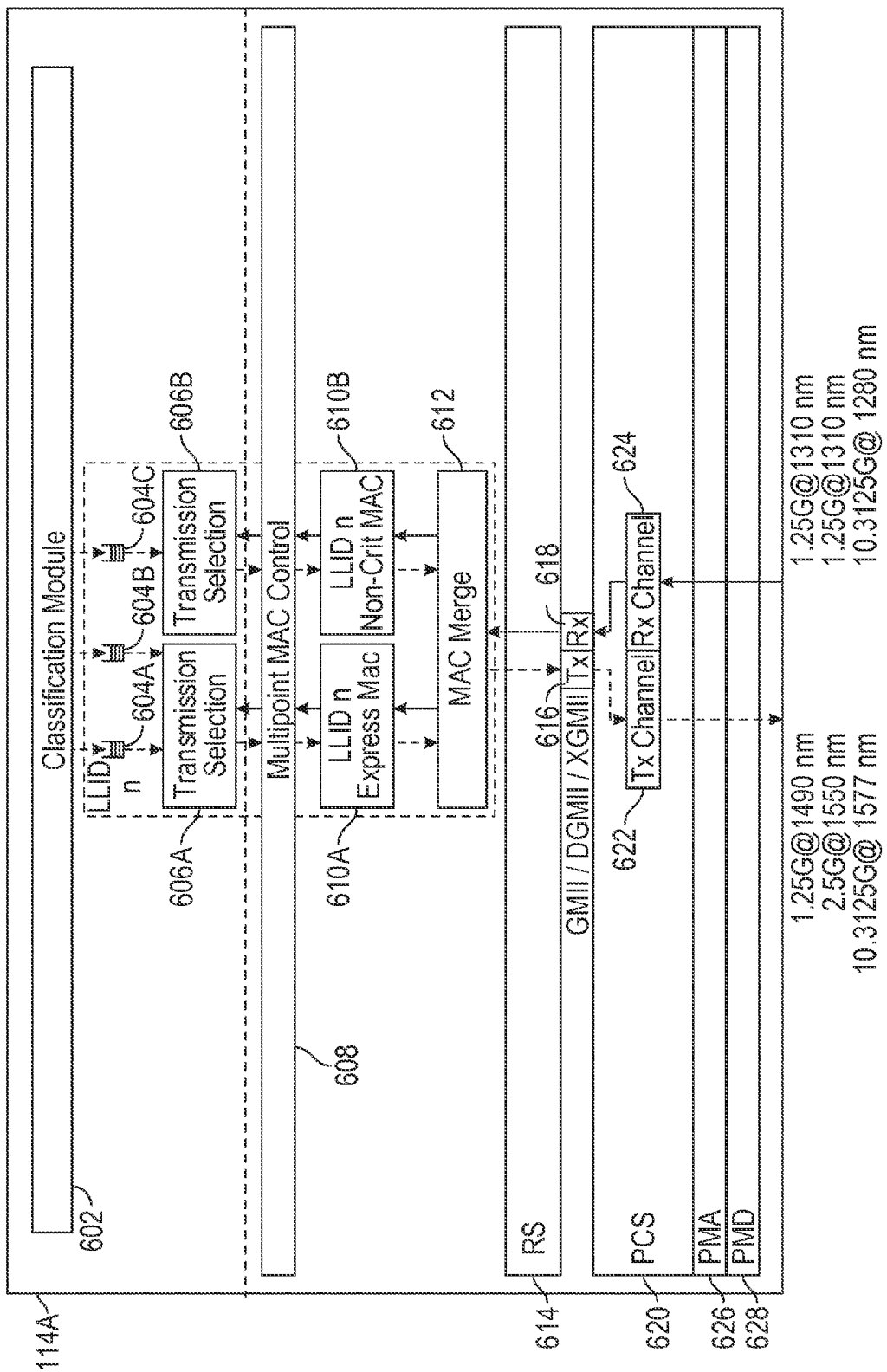
FIG. 6 illustrates an example ONU in a system for pre-emption in a passive optical network in accordance with one or more implementations.

FIG. 6 illustrates an example ONU 114A in a system for pre-emption in a passive optical network in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The ONU 114A may include a classification module 602, one or more queues 604A-C, one or more transmission selection modules 606A-B, a multipoint MAC control module 608, one or more MAC modules 610A-B, a MAC merge module 612, an RS 614, a transmit interface 616, a receive interface 618, a PCS 620, a PMA sublayer 626, and a PMD sublayer 628. The PCS 620 may include a transmit channel 622, and a receive channel 624. In one or more implementations, the PMD sublayer 628 may include and/or may be communicatively coupled to a port, such as a PON port, that interfaces with the ODN 110.

The MAC module 610A may be associated with a first type of data traffic, such as express data traffic, and may be referred to, in one or more implementations, as an express MAC module 610A. The MAC module 610B may be associated with a second type of data traffic, such as non-critical data traffic, and may be referred to, in one or more implementations, as a non-critical MAC module 610B. In one or more implementations, one or more of the MAC modules 610A-B may be physically separate modules and/or one or more of the MAC modules 610A-B may be logically separated modules. In one or more implementations, the ONU 114A may be associated with multiple LLIDs and may include multiple transmission selection modules 606A-B, MAC modules 610A-B, and MAC merge modules 612 to support the multiple LLIDs.

In operation, the classification module 602 queues frames into the queues 604A-C. The transmission selection modules 606A-B select non-critical and/or express frames from the queues 604A-C for transmission by the associated MAC modules 610A-B. The multipoint MAC control module 404 provides control functionality across the MAC modules 610A-B, such as by arbitrating transmission of frames to the MAC modules 610A-B. The MAC merge module 612 may arbitrate the transmission of frames from the MAC modules 610A-B, such as for transmission over the ODN 110.

In one or more implementations, if express data traffic is detected, such as by the multipoint MAC control module 608 and/or the express MAC module 610A, the transmission of any non-critical data traffic by the non-critical MAC module 610B may be stopped such that the express data traffic may be transmitted by the express MAC module 610A. Once the transmission of the express data traffic by the express MAC module 610A has completed, the non-critical MAC module 610B may resume transmission of the non-critical data traffic. In one or more implementations, the non-critical MAC module 610B may utilize frame segmentation techniques to transmit a portion of a frame prior to stopping the transmission of the non-critical data traffic and transmitting the remaining portion of the frame after resuming the transmission of the non-critical data traffic.

In one or more implementations, one or more of the classification module 602, the transmission selection modules 606A-B, the queues 604A-C, the multipoint MAC control module 608, the MAC modules 610A-B, the MAC merge module 612, the transmit interface 616, the receive interface 618, the RS 614, the PCS 620, the PMA sublayer 626, the PMD sublayer 628, the transmit channel 622, and/or the receive channel 624 may be implemented in software (e.g., subroutines and code) and/or hardware (e.g., an ASIC, a FPGA, a PLD, a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 7:
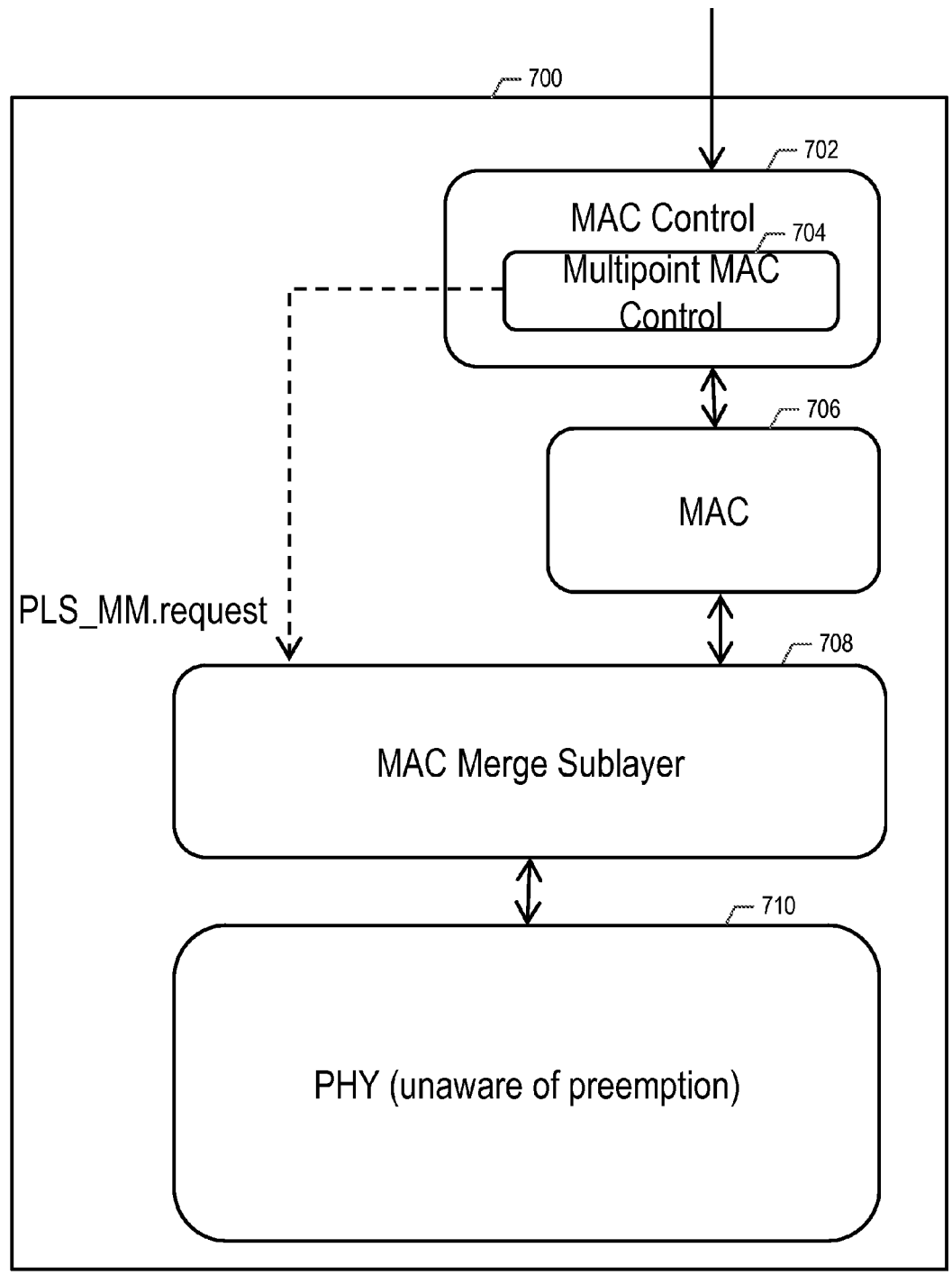
FIG. 7 illustrates an example multipoint MAC device that may be used in an OLT and/or an ONU in a system for pre-emption in a passive optical network in accordance with one or more implementations.

FIG. 7 illustrates an example multipoint MAC device 700 that may be used in an OLT and/or an ONU in a system for pre-emption in a passive optical network in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The example multipoint MAC device 700 includes a MAC control module 702, a multipoint MAC control module 704, a MAC module 706, a MAC merge sublayer 708, and a physical (PHY) layer 710. In one or more implementations, the multipoint MAC device 700 may not support express data traffic, e.g. to and from the MAC client. In one or more implementations, the multipoint MAC device 700 may be included, in its entirety and/or in part, in the OLT 102 and/or one or more of the ONUs 114A-D. The OLT 102 and/or the one or more ONUs 114A-D may utilize interspersed express data traffic (IET) to minimize wasted bandwidth at the end of a gate.

In operation, the multipoint MAC control module 704 generates the request signal (PLS_MM.request) and transmits the signal to the MAC merge sublayer 708. The request signal may be a hold request signal as the end of the gate approaches, i.e. to stop transmission, and a release request signal at the start of the gate to resume transmission.

In one or more implementations, one or more of the MAC control module 702, the multipoint MAC control module 704, the MAC module 706, the MAC merge sublayer 708, and the physical (PHY) layer 710 may be implemented in software (e.g., subroutines and code) and/or hardware (e.g., an ASIC, a FPGA, a PLD, a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 8:
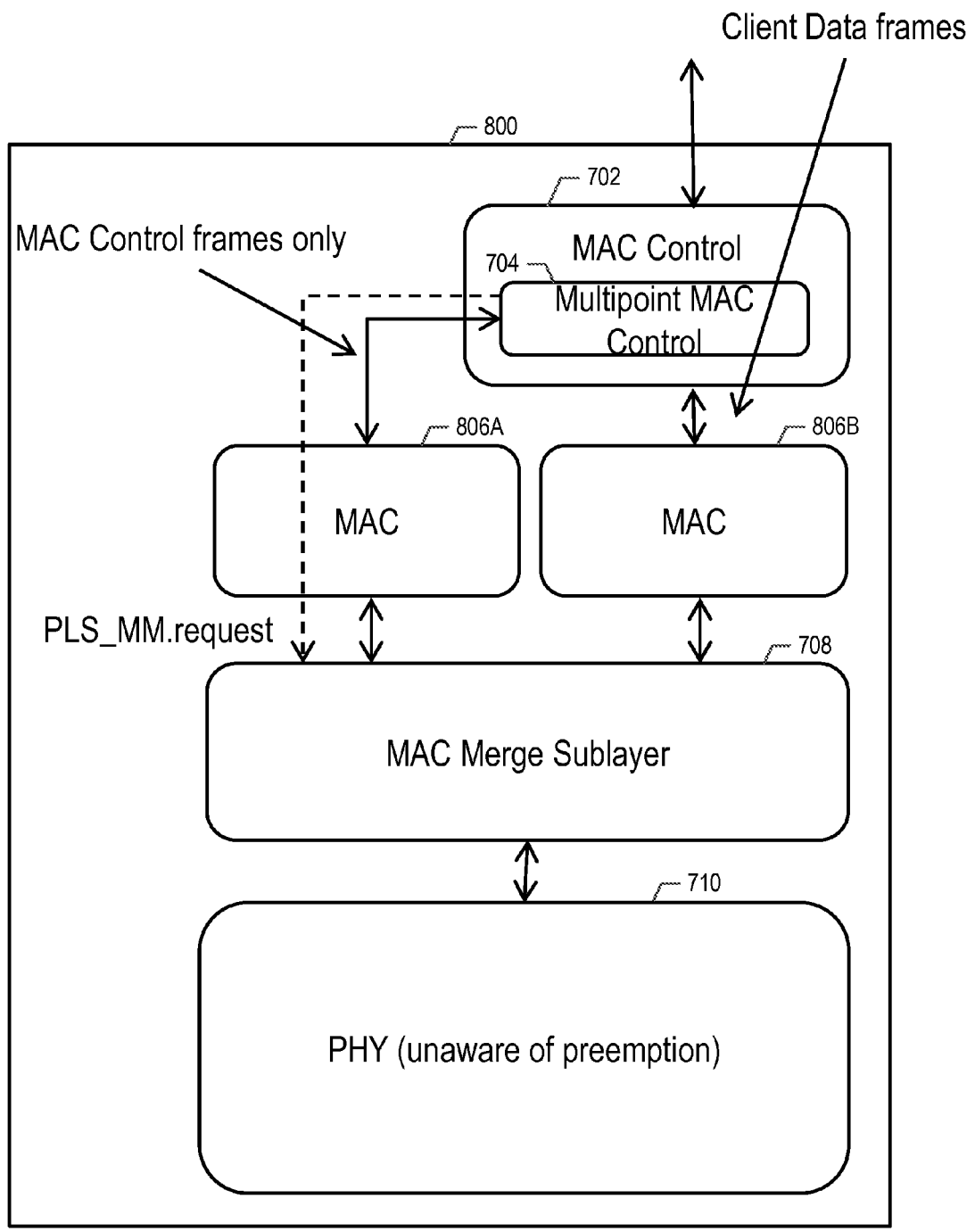
FIG. 8 illustrates an example multipoint MAC device that may be used in an OLT and/or an ONU in a system for pre-emption in a passive optical network in accordance with one or more implementations.

FIG. 8 illustrates an example multipoint MAC device 800 that may be used in an OLT and/or an ONU in a system for pre-emption in a passive optical network in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The example multipoint MAC device 800 includes a MAC control module 702, a multipoint MAC control module 704, one or more MAC modules 806A-B, a MAC merge sublayer 708, and a physical (PHY) layer 710. In one or more implementations, the multipoint MAC device 800 may not support express data traffic, e.g. to and from the MAC client. In one or more implementations, the multipoint MAC device 800 may be included, in its entirety and/or in part, in the OLT 102 and/or one or more of the ONUs 114A-D. The OLT 102 and/or the one or more ONUs 114A-D may utilize interspersed express data traffic (IET) to minimize wasted bandwidth at the end of a gate. The MAC module 806A may be associated with a first type of data traffic, such as express data traffic, and may be referred to as an express MAC module 806A. The MAC module 806B may be associated with a second type of data traffic, such as non-critical data traffic, and may be referred to as a non-critical MAC module 806B.

In operation, the multipoint MAC control module 704 generates the request signal (PLS_MM.request) and transmits the request signal to the MAC merge sublayer 708. The request signal may be passed to the MAC merge sublayer 708 using a control path. The control path may go through the express MAC module 806A, or may bypass the express MAC module 806A to go directly to the MAC merge sublayer 708. The request signal may be a hold request signal as the end of the gate approaches, i.e. to stop transmission, and a release request signal at the start of the gate to resume transmission. The MAC merge sublayer 708 may hold or release data traffic, such as express data traffic and/or non-critical data traffic, based at least in part on the received request signal.

In one or more implementations, one or more of the MAC modules 806A-B may be implemented in software (e.g., subroutines and code) and/or hardware (e.g., an ASIC, a FPGA, a PLD, a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 9:
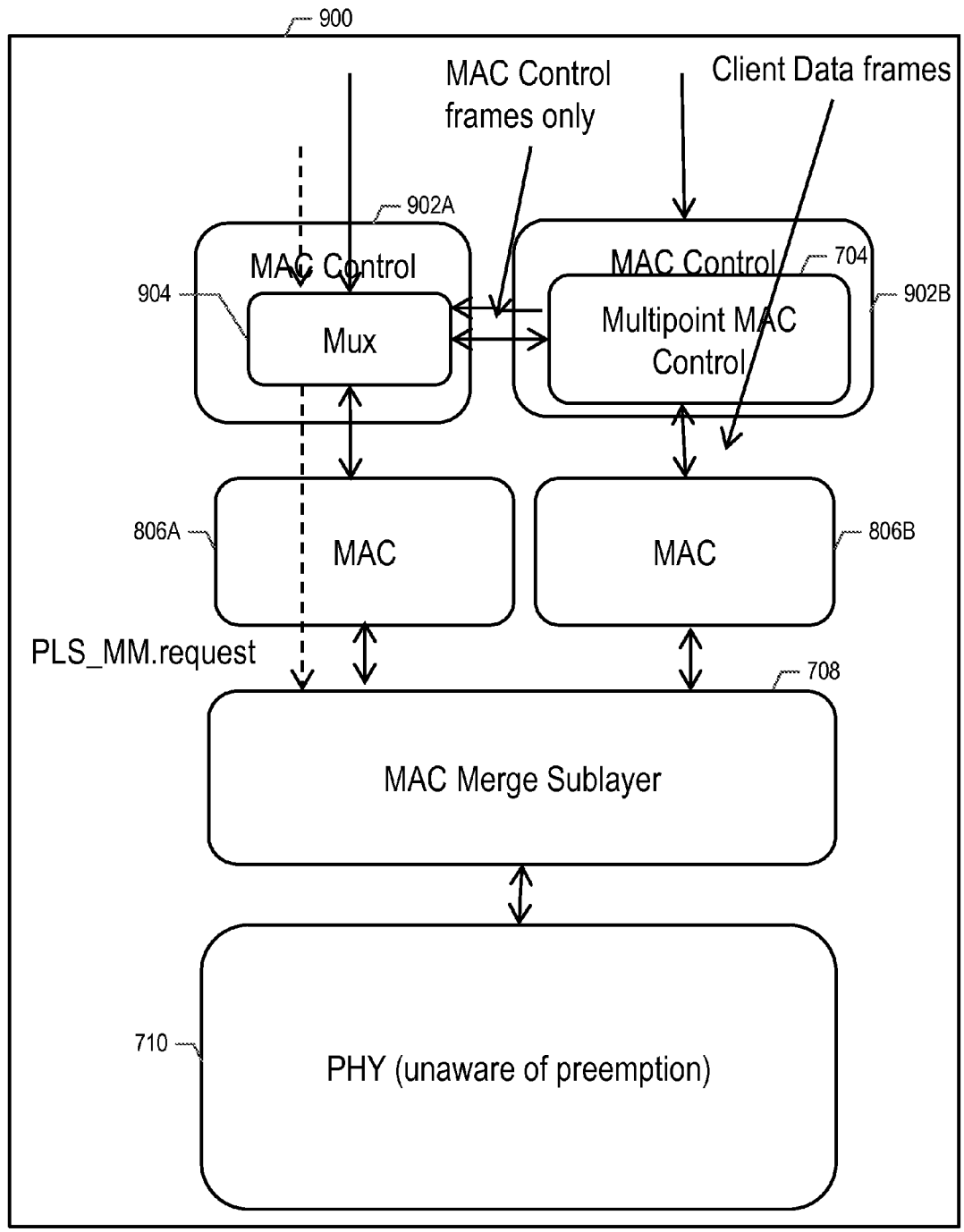
FIG. 9 illustrates an example multipoint MAC device that may be used in an OLT and/or an ONU in a system for pre-emption in a passive optical network in accordance with one or more implementations.

FIG. 9 illustrates an example multipoint MAC device 900 that may be used in an OLT and/or an ONU in a system for pre-emption in a passive optical network in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The example multipoint MAC device 900 includes MAC control modules 902A-B, a multipoint MAC control module 704, a multiplexer 904, one or more MAC modules 806A-B, a MAC merge sublayer 708, and a physical (PHY) layer 710. In one or more implementations, the multipoint MAC device 900 may be included, in its entirety and/or in part, in the OLT 102 and/or one or more of the ONUs 114A-D. The MAC control module 902A may be associated with a first type of data traffic, such as express data traffic, and may be referred to as an express MAC control module 902A. The MAC control module 902B may be associated with a second type of data traffic, such as non-critical data traffic, and may be referred to as a non-critical MAC control module 902B.

In operation, the multiplexer 904 selects the next frame to transmit, either a MAC control frame from the multipoint MAC control module 704, or an express frame from the MAC client. The multiplexer 904 also transmits a request signal, such as a hold request signal and/or a release request signal, that is received from a MAC client device. The hold request signal and/or the release request signal are transmitted to the MAC merge sublayer 708 using a control path. The control path may go through the express MAC module 806A, or may bypass the express MAC module 806A to go directly to the MAC merge sublayer 708. The MAC merge sublayer 708 may hold or release non-critical traffic based at least in part on the received request signal.

In one or more implementations, one or more of the MAC control modules 902A-B and/or the multiplexer 904 may be implemented in software (e.g., subroutines and code) and/or hardware (e.g., an ASIC, a FPGA, a PLD, a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 10:
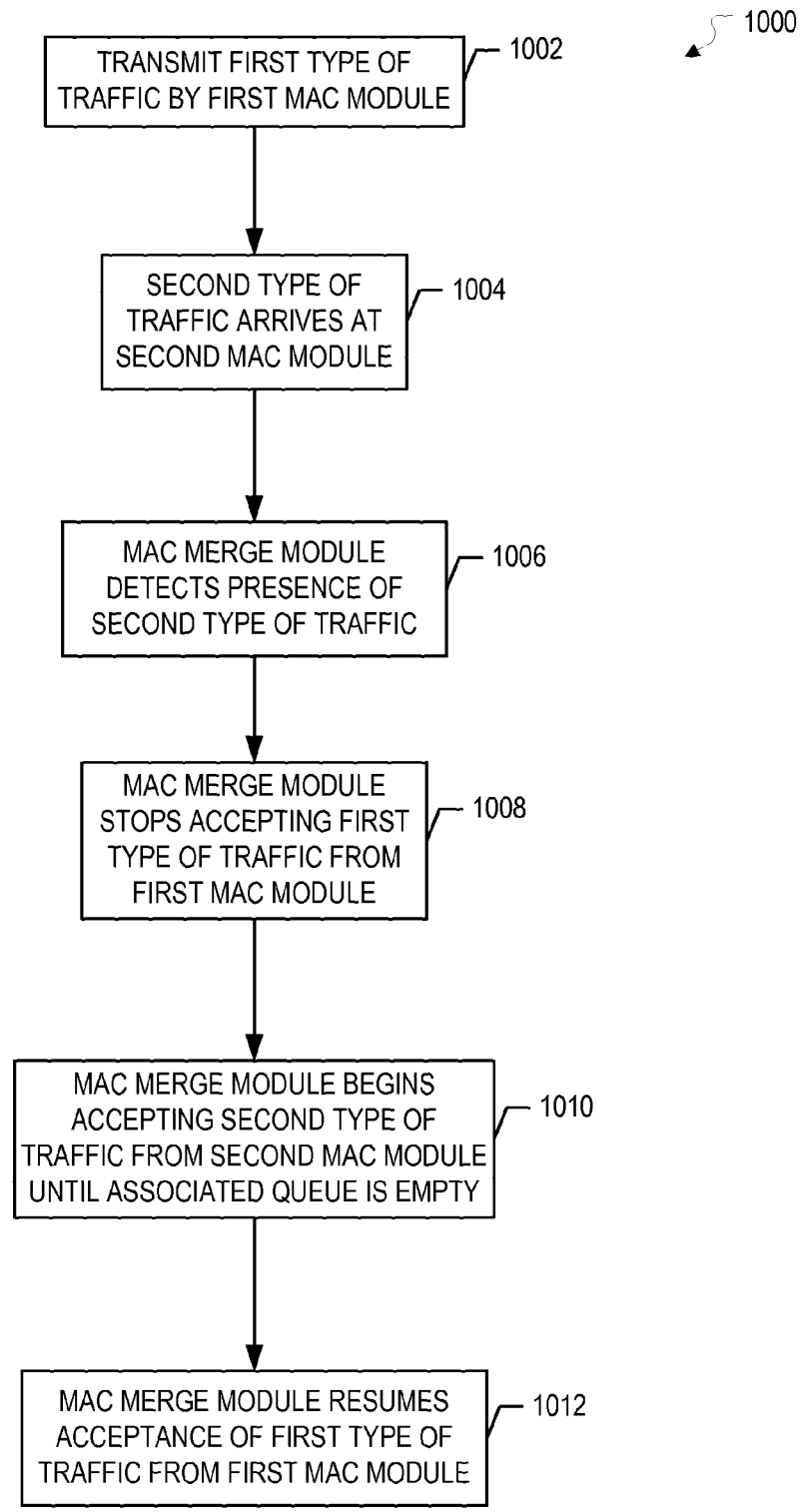
FIG. 10 illustrates a flow diagram of an example process of a system for pre-emption in a passive optical network in accordance with one or more implementations.

FIG. 10 illustrates a flow diagram of an example process 1000 of a system for pre-emption in a passive optical network in accordance with one or more implementations. For explanatory purposes, the example process 1000 is primarily described herein with reference to OLT 102 of FIG. 4; however, the example process 1000 is not limited to the OLT 102 of FIG. 4, and the example process 1000 may be performed by one or more components of the OLT 102, and/or one or more other devices, such as one or more of the ONUs 114A-D. Further for explanatory purposes, the blocks of the example process 1000 are described herein as occurring in serial, or linearly. However, multiple blocks of the example process 1000 may occur in parallel. In addition, the blocks of the example process 1000 may be performed a different order than the order shown.

A first type of data traffic, such as non-critical data traffic, is transmitted by a first MAC module associated with a first LLID, such as the non-critical MAC module 406B, to the MAC merge module associated with the first LLID, such as the MAC merge module 408A (1002). A second type of data traffic, such as express data traffic, arrives at, and/or is detected by, a second MAC module associated with the first LLID, such as the express MAC module 406A (1004). The MAC merge module associated with the first LLID, such as the MAC merge module 408A, detects the presence of the second type of data traffic (1006). The MAC merge module associated with the first LLID, such as the MAC merge module 408A stops accepting bits of the first type of data traffic, such as non-critical data traffic, from the first MAC module associated with the first LLID, such as the non-critical MAC module 406B (1008). In one or more implementations, the MAC merge module 408A and/or the non-critical MAC module 406B may utilize frame segmentation techniques to transmit a first portion of a frame of the first type of data traffic, but not the remaining portion of the frame, before stopping the acceptance of bits of the first type of data traffic.

The MAC merge module associated with the first LLID, such as the MAC merge module 408A, then begins to accept bits of the second type of data traffic, such as express data traffic, from the second MAC module associated with the first LLID, such as the express MAC module 406A, and continues to accept the bits of the second type of data traffic until the associated one or more queues 304A-B are emptied (1010). The MAC merge module associated with the first LLID, such as the MAC merge module 408A, then resumes acceptance of the first type of data traffic, such as non-critical data traffic, from the first MAC module associated with the LLID, such as the non-critical MAC module 406B (1012). In one or more implementations, the MAC merge module 408A and/or the non-critical MAC module 406B may utilize frame segmentation techniques to transmit a remaining portion of a frame of the first type of data traffic after resuming the acceptance of bits of the first type of data traffic, where the first portion of the frame was transmitted prior to stopping the acceptance of bits of the first type of data traffic.

Figure 11:
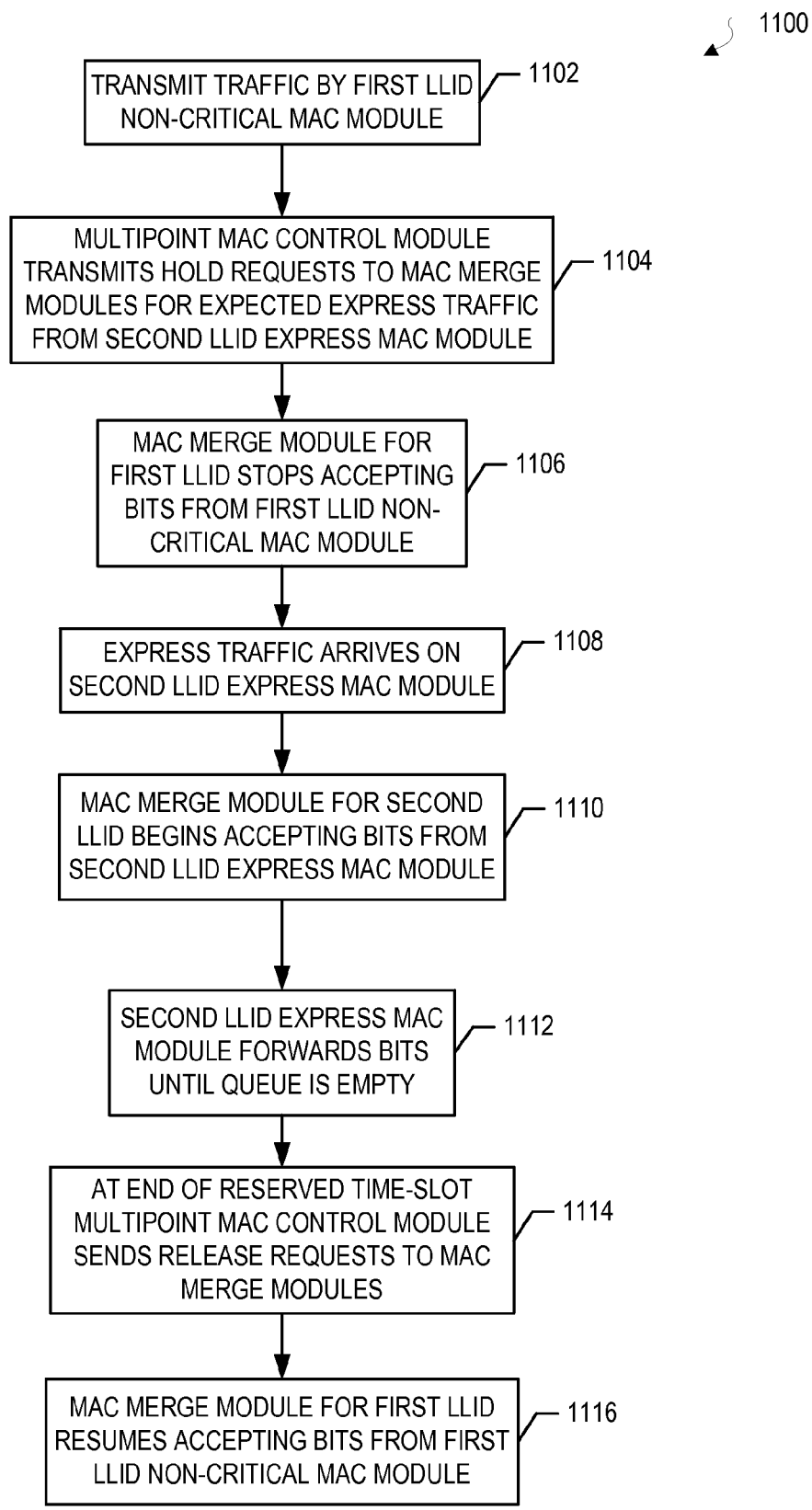
FIG. 11 illustrates a flow diagram of an example process of a system for pre-emption in a passive optical network in accordance with one or more implementations.

FIG. 11 illustrates a flow diagram of an example process 1100 of a system for pre-emption in a passive optical network in accordance with one or more implementations. For explanatory purposes, the example process 1100 is primarily described herein with reference to OLT 102 of FIG. 5; however, the example process 1100 is not limited to the OLT 102 of FIG. 5, and the example process 1100 may be performed by one or more components of the OLT 102, and/or one or more other devices, such as one or more of the ONUs 114A-D. Further for explanatory purposes, the blocks of the example process 1100 are described herein as occurring in serial, or linearly. However, multiple blocks of the example process 1100 may occur in parallel. In addition, the blocks of the example process 1100 may be performed a different order than the order shown.

A first type of data traffic, such as non-critical data traffic, is transmitted by a non-critical MAC module 406B that is associated with a first LLID (1102). A multipoint MAC control module 404 determines a timeslot associated with an expected and/or anticipated transmission of a second type of data traffic, such as express data traffic, associated with a second LLID, and transmits a hold request to each of the MAC merge modules 408A-C, such as via the signaling mechanisms 502A-C (1104). In one or more implementations, the request may indicate a time slot, a time period, and/or a duration of the expected express data traffic transmission. In response to the request, and/or based at least in part on a time slot, time period and/or duration indicated by the request, the MAC merge module 408A associated with the first LLID stops accepting bits from the non-critical MAC module 406B associated with the first LLID (1106).

The express data traffic arrives on the express MAC module 406E associated with the second LLID (1108). The MAC merge module 408C that is associated with the second LLID begins accepting bits from the express MAC module 406E associated with the second LLID (1110). The express MAC module 406E associated with the second LLID forwards bits to the MAC merge module 408C until the associated one or more queues 304F containing express data traffic are empty (1112). Once the associated one or more queues 304F are empty and/or upon expiration of a time slot, time period, and/or duration indicated by the request, the multipoint MAC control module 404 transmits a release request to each of the MAC merge modules 408A-C, such as via the signaling mechanisms 502A-C (1114). In response to receiving the release request, the MAC merge module 408A associated with the first LLID may then resume accepting bits of the first type of data traffic from the non-critical MAC module 406B associated with the first LLID (1116).

Figure 12:
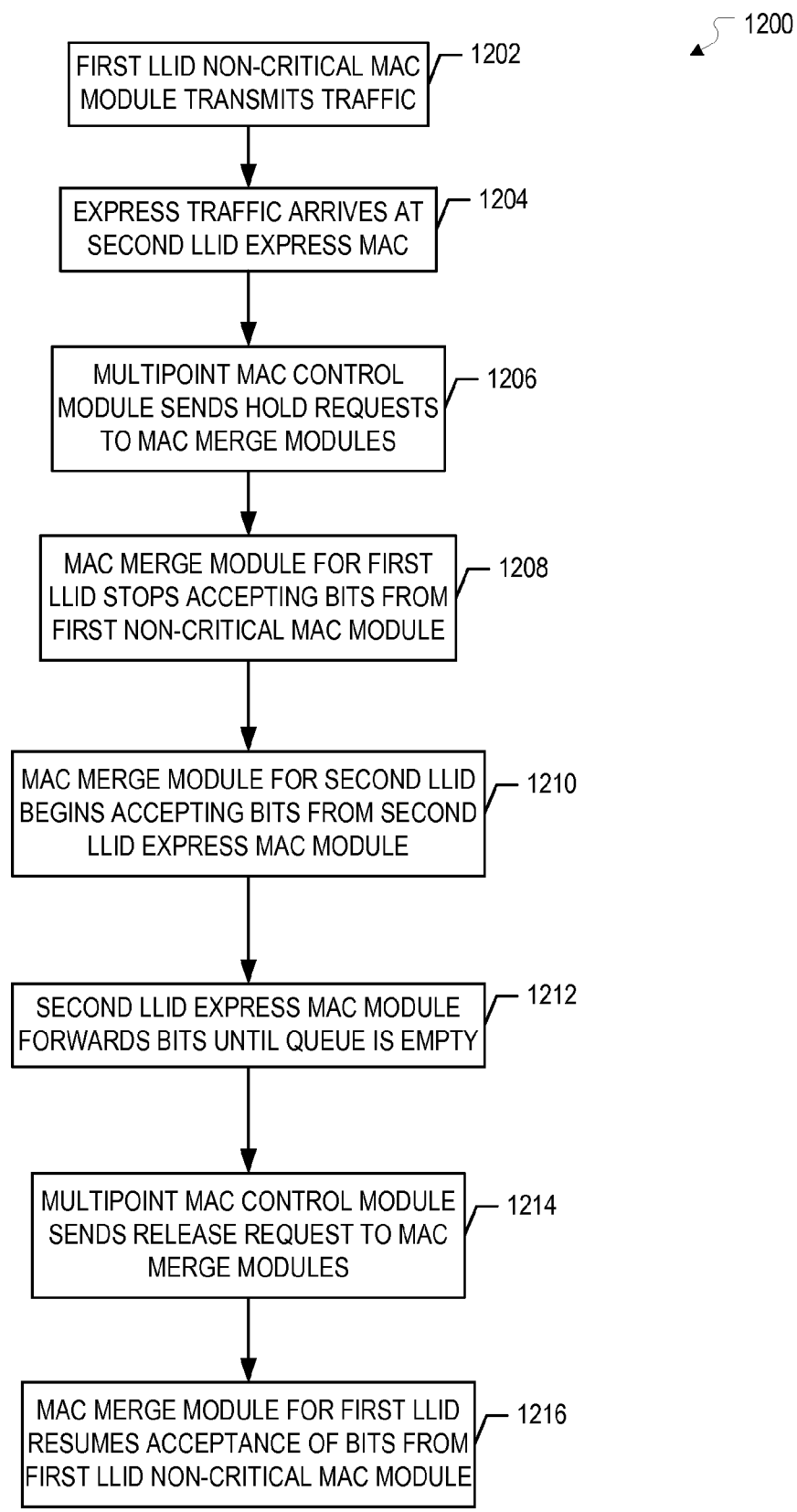
FIG. 12 illustrates a flow diagram of an example process of a system for pre-emption in a passive optical network in accordance with one or more implementations.

FIG. 12 illustrates a flow diagram of an example process 1200 of a system for pre-emption in a passive optical network in accordance with one or more implementations. For explanatory purposes, the example process 1200 is primarily described herein with reference to OLT 102 of FIG. 5; however, the example process 1200 is not limited to the OLT 102 of FIG. 5, and the example process 1200 may be performed by one or more components of the OLT 102, and/or one or more other devices, such as one or more of the ONUs 114A-D. Further for explanatory purposes, the blocks of the example process 1200 are described herein as occurring in serial, or linearly. However, multiple blocks of the example process 1200 may occur in parallel. In addition, the blocks of the example process 1200 may be performed a different order than the order shown.

A first type of data traffic associated with a first LLID, such as non-critical data traffic, is transmitted by a non-critical MAC module 406B that is associated with the first LLID (1202). A second type of data traffic associated with a second LLID, such as critical data traffic arrives on the express MAC module 406E associated with the second LLID (1204). A multipoint MAC control module 404 transmits a hold request to each of the MAC merge modules 408A-C, such as via the signaling mechanisms 502A-C (1206). In response to the request, the MAC merge module 408A associated with the first LLID stops accepting bits from the non-critical MAC module 406B associated with the first LLID (1208).

The MAC merge module 408C that is associated with the second LLID begins accepting bits from the express MAC module 406E associated with the second LLID (1210). The express MAC module 406E associated with the second LLID forwards bits to the MAC merge module 408C until the associated one or more queues 304F containing express data traffic are empty (1212). Once the associated one or more queues 304F are empty, the multipoint MAC control module 404 transmits a release request to each of the MAC merge modules 408A-C, such as via the signaling mechanisms 502A-C (1214). In response to receiving the release request, the MAC merge module 408A associated with the first LLID may then resume accepting bits of the first type of data traffic from the non-critical MAC module 406B associated with the first LLID (1216).

Figure 13:
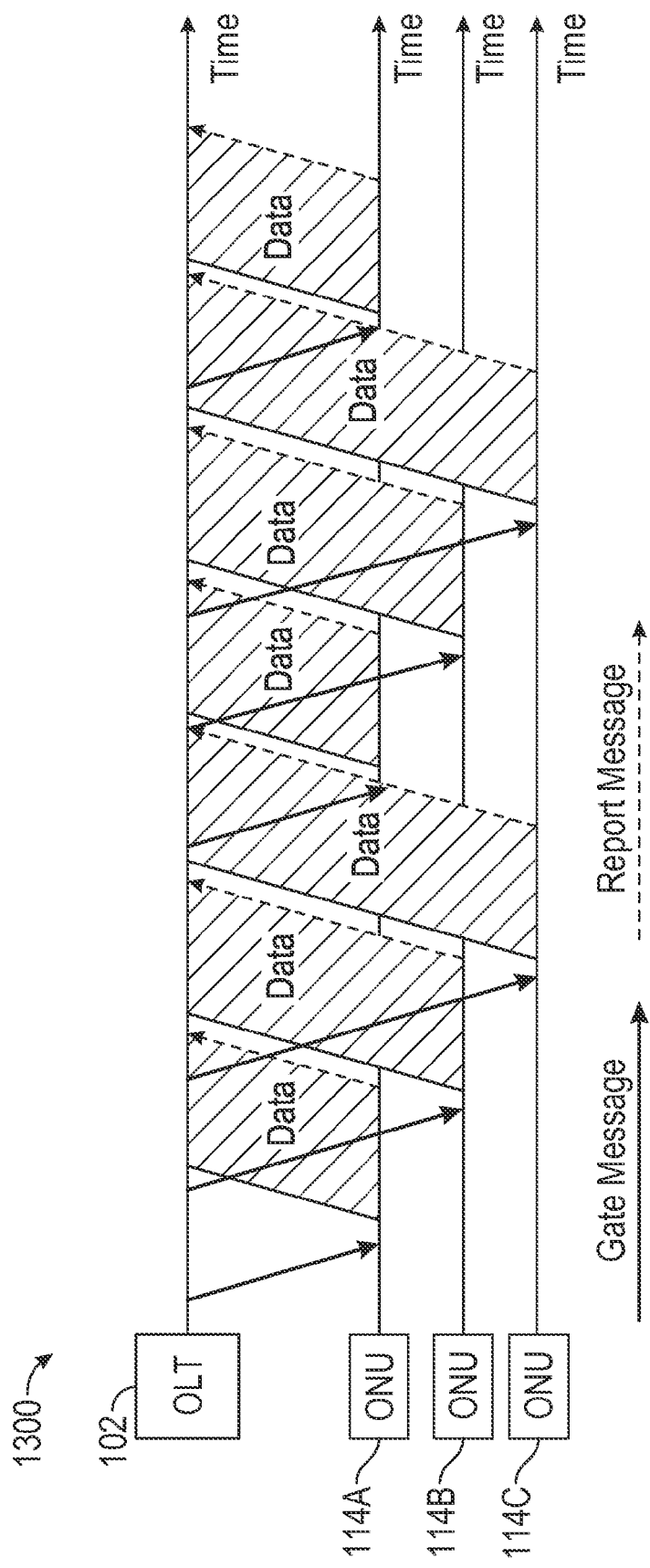
FIG. 13 illustrates an example grant timing diagram of a system for pre-emption in a passive optical network in accordance with one or more implementations.

FIG. 13 illustrates an example grant timing diagram 1300 of a system for pre-emption in a passive optical network in accordance with one or more implementations. The timing diagram 1300 illustrates the timing of gate message transmissions by the OLT 102 to the ONUs 114A-C, data transmissions by the ONUs 114A-D, and report message transmissions by the ONUs 114A-C to the OLT. In one or more implementations, the OLT 102 may transmit gate messages to assign transmission time slots to the ONUs 114A-C. The ONUs 114A-C may transmit data onto the ODN 110 at the respective assigned times and may subsequently transmit report messages to indicate buffer occupancy and other parameters to the OLT 102. As shown in FIG. 13, only one of the ONUs 114A-C transmits data and/or report messages onto the ODN 110 in non-overlapping time slots, e.g. in order to avoid collisions. In one or more implementations, MAC control in the ONUs 114A-C provides the stop-and-go transmission behavior. In one or more implementations, the PHY of the ONUs 114A-C may turn off the laser when long streams of idles are detected.

In one or more implementations that utilize 10 G-EPON, the 10 G-EPON may include stream based forward error correction (FEC) Reed-Solomon (RS) (255, 223). Thus, after alignment with 66b/64b, there may be 248 octets for codewords, 216 octets for payload, and 32 octets for parity. In one or more implementations, the OLT 102 may grant the ONUs 114A-C a number of FEC codewords for transmission. The cumulative length of frames queued at the ONU 114A may not align with the available grant space, e.g. N codewords times 216 octets of payload. Thus, there may be an unused remainder between 1 and 215 octets. In one or more implementations utilizing higher speeds, larger FEC codeword sizes may be required, thereby increasing the potential size of the unused remainder.

Figure 14:
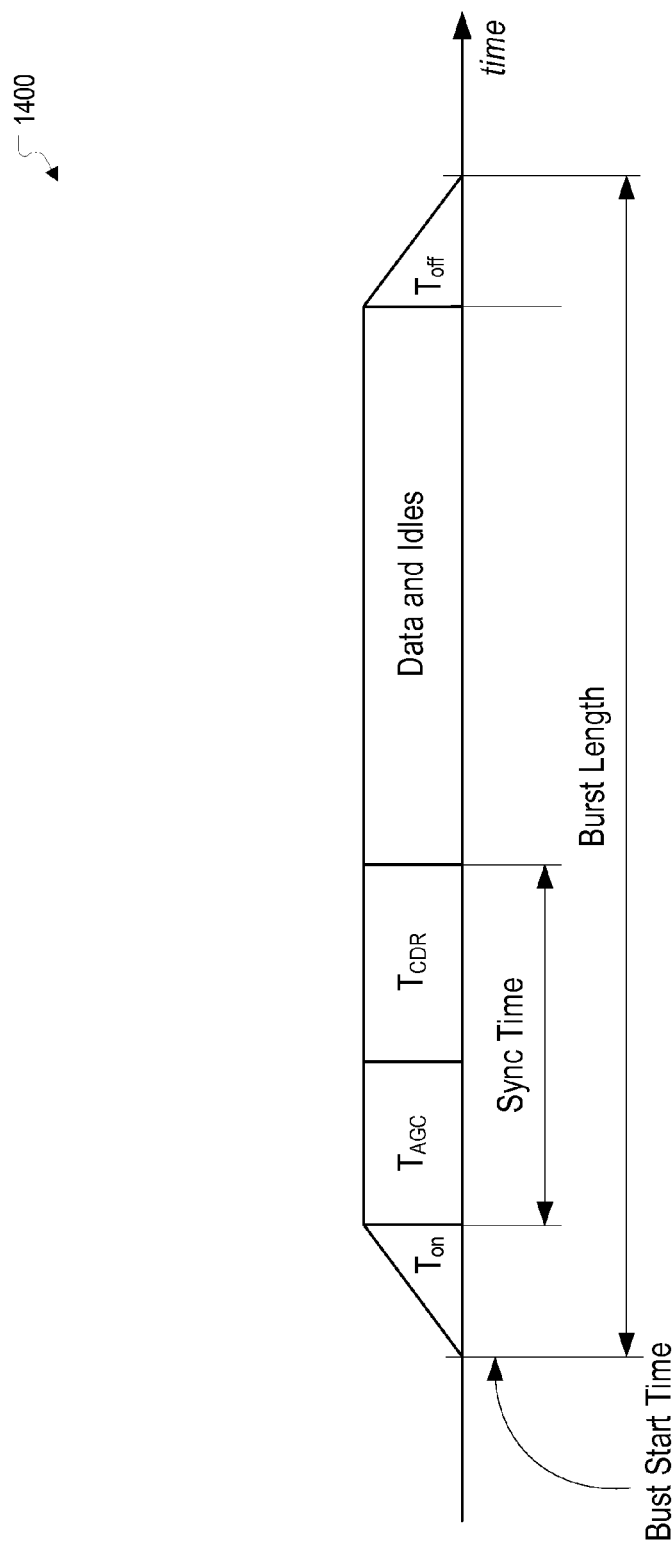
FIG. 14 illustrates an example grant structure of a system for pre-emption in a passive optical network in accordance with one or more implementations.

FIG. 14 illustrates an example grant structure 1400 of a system for pre-emption in a passive optical network in accordance with one or more implementations. The grant structure 1400 illustrates the burst start time, followed by the time for the PHY to turn on the laser, followed by the sync time, the time for transmitting data and idles, and the time for the PHY to turn off the laser.

Figure 15A:
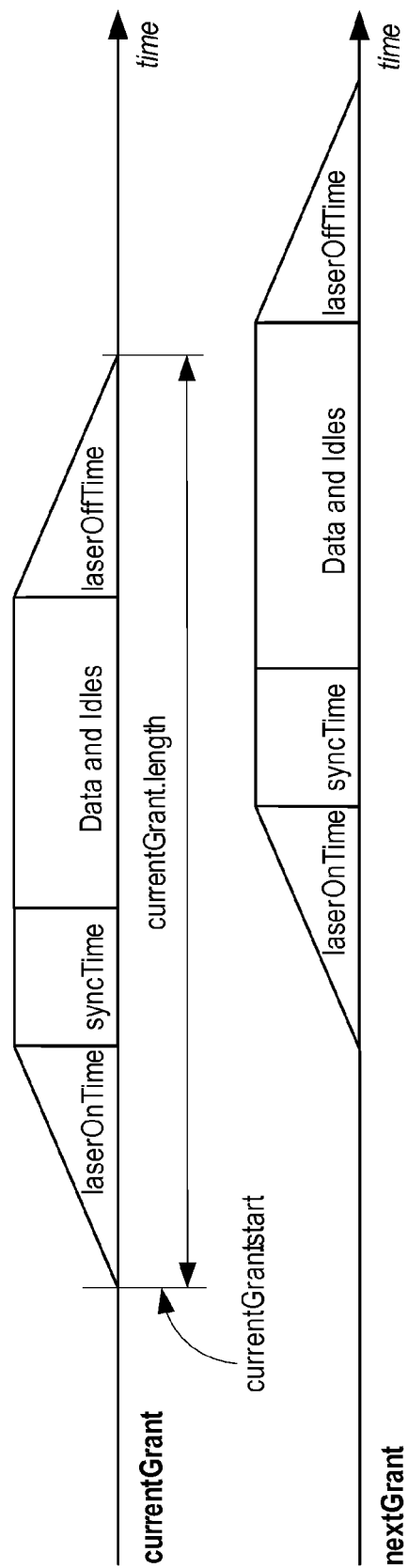
FIG. 15A-B illustrate example overlapped grants in a system for pre-emption in a passive optical network in accordance with one or more implementations.
Figure 15B:
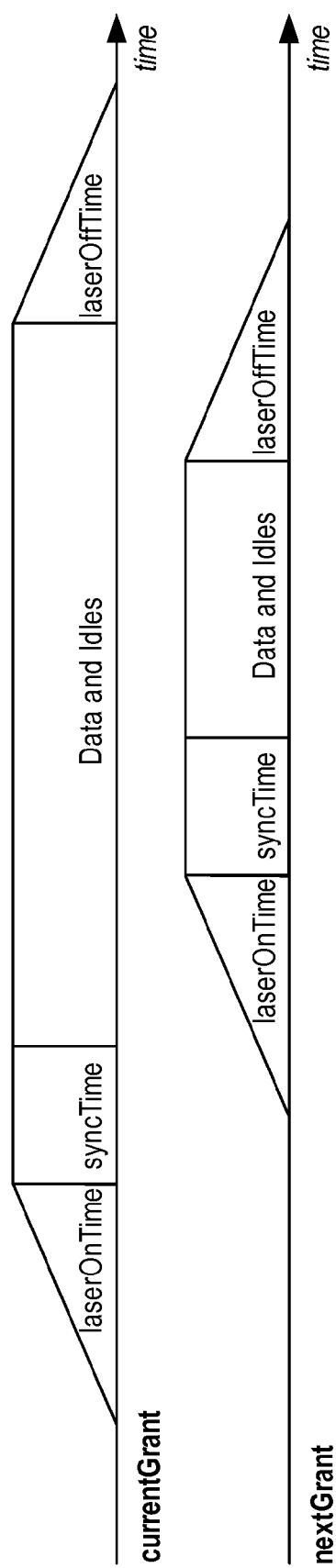

FIG. 15A-B illustrate example overlapped grants in a system for pre-emption in a passive optical network in accordance with one or more implementations. As shown in FIGS. 15A-B, multiple grants having the grant structure 1400 may partially overlap. For example, a current grant may be completing transmission of the data and idles, and/or still completing synchronization, when the next grant begins.

Figure 16A:
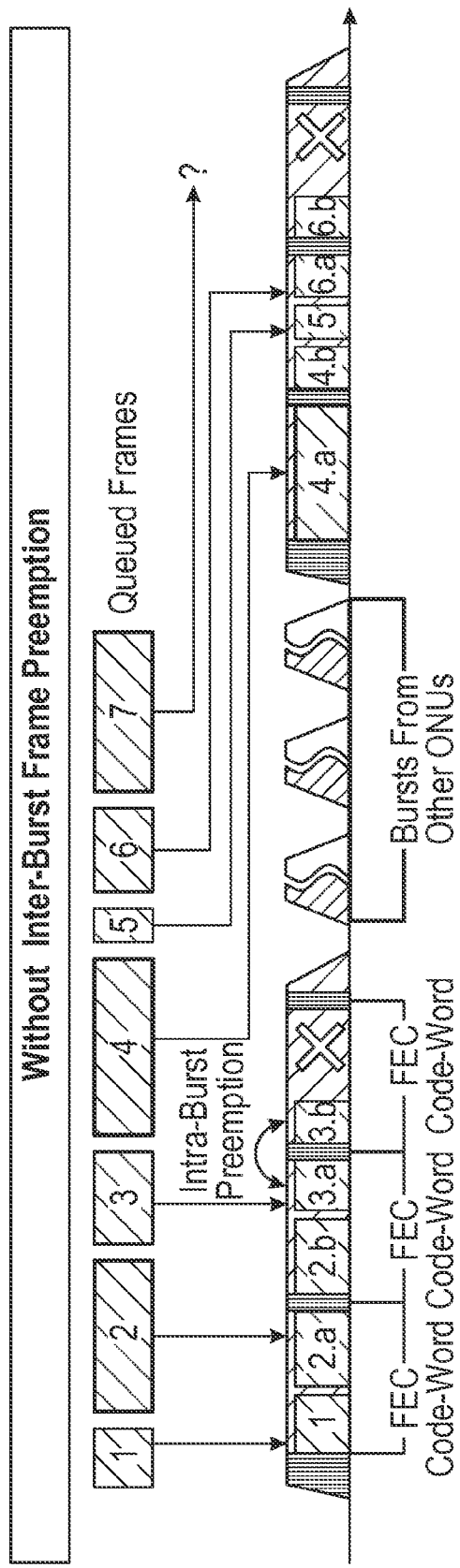
FIG. 16A illustrates an example transmission without inter-burst pre-emption in a passive optical network in accordance with one or more implementations.

FIG. 16A illustrates an example transmission without inter-burst pre-emption in a passive optical network in accordance with one or more implementations. Since there is no inter-burst pre-emption in FIG. 16A, no portion of the fourth frame can be transmitted before the bursts from the other ONUs, and therefore a portion of a slot is unused, and the entirety of the fourth frame is transmitted after the bursts from the other ONUs. As a consequence, an even larger accumulated portion of a slot is unused after transmission of the sixth frame, because the remaining portion of the FEC codeword cannot accommodate the seventh frame. FIG. 16A also illustrates where the third frame is split into two portions, 3a-b, to fit in the FEC codewords. The first portion of the third frame, is transmitted in a first FEC codeword, and a remaining portion of the third frame is transmitted in a second FEC codeword.

Figure 16B:
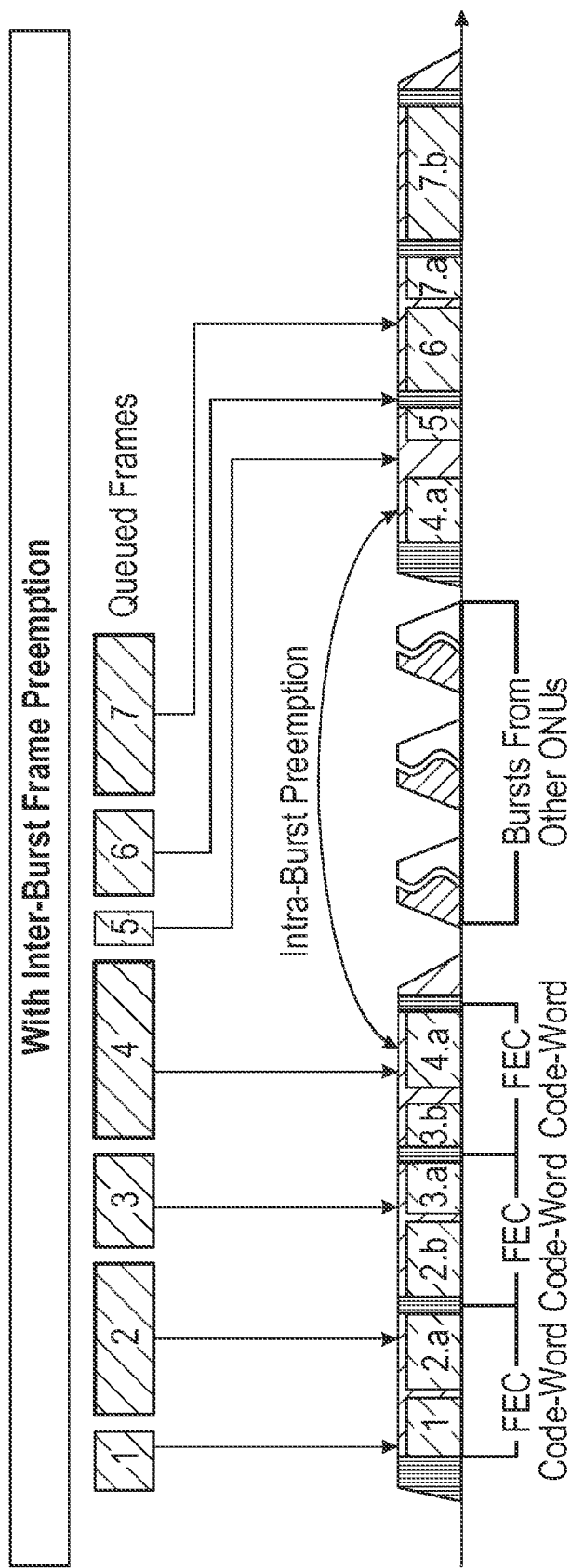
FIG. 16B illustrates the example transmission with inter-burst pre-emption in accordance with one or more implementations.

FIG. 16B illustrates the example transmission with inter-burst pre-emption in accordance with one or more implementations. Since there is inter-burst pre-emption in FIG. 16A, a first portion of the fourth frame can be transmitted before the bursts from the other ONUs, and a remaining portion of the fourth frame is transmitted after the bursts from the other ONUs. In one or more implementations, frame segmentation techniques may be used to split the frame into the first and remaining portions. Furthermore, the first and remaining portions of the seventh frame can be accommodated in the allocated codewords.

In one or more implementations, the pre-emption used for Distinguished Minimum Latency Traffic in a Converged Traffic Environment (DMLT), such as IEEE Standard for Ethernet, Amendment Specification and Management Parameters for Interspersing Express Traffic (P802.3br), may also be used to solve the unused slot remainder problem discussed above. For example, EPON may also be used in time-critical environments and may benefit from DMLT mechanisms applied in either one or both directions. Thus, the DMLT objective may be modified to support full duplex and/or point-to-point operation, such as in a PON environment.

Figure 17:
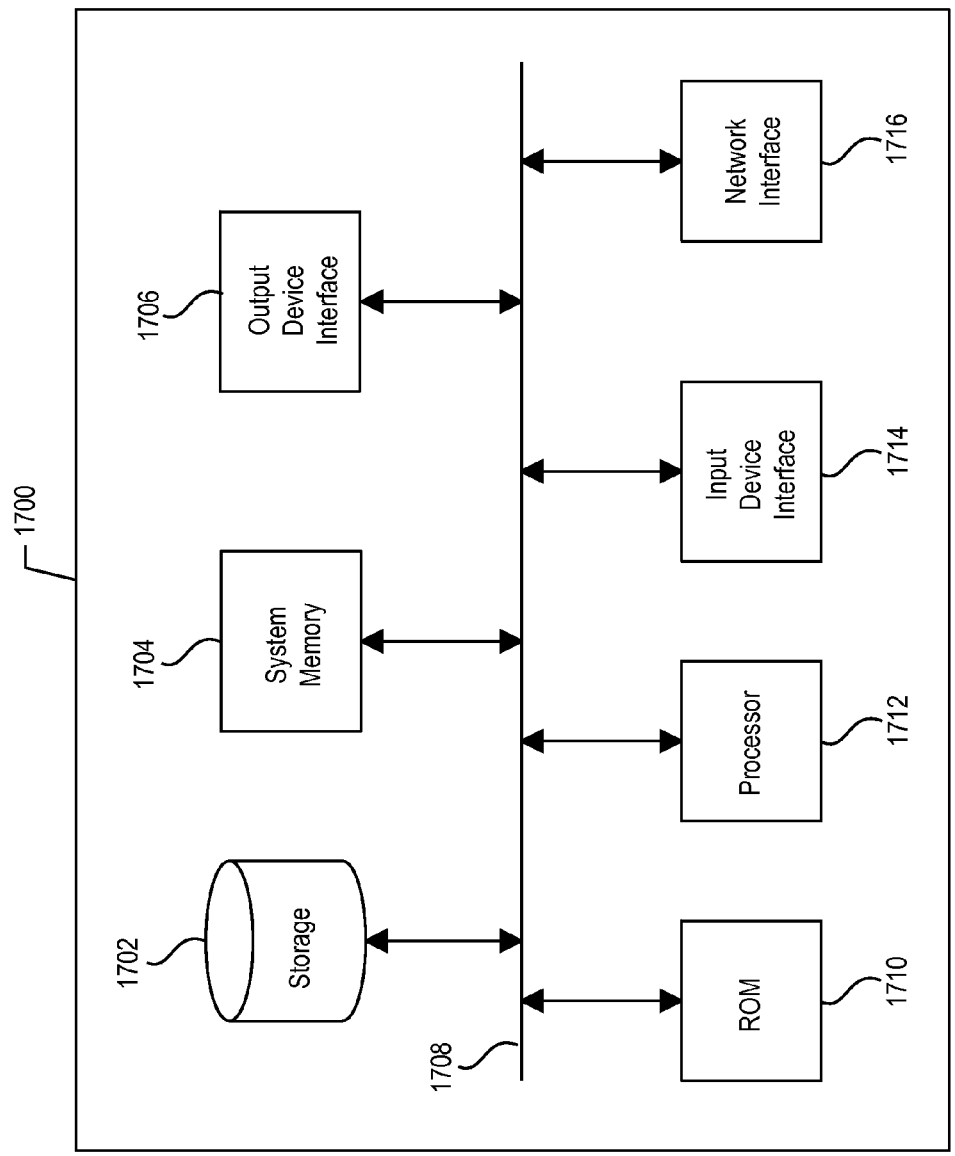
FIG. 17 conceptually illustrates an example electronic system with which one or more implementations of the subject technology can be implemented.

FIG. 17 conceptually illustrates an example electronic system with which one or more implementations of the subject technology can be implemented. The electronic system 1700, for example, may be, or may include, the OLT 102, one or more of the ONUs 114A-D, one or more of the user devices 216A-C, and/or one or more electronic devices associated with the customer premises 116A-D, such as a desktop computer, a laptop computer, a tablet computer, a phone, and/or generally any electronic device. Such an electronic system 1700 includes various types of computer readable media and interfaces for various other types of computer readable media. The electronic system 1700 includes a bus 1708, one or more processing unit(s) 1712, a system memory 1704, a read-only memory (ROM) 1710, a permanent storage device 1702, an input device interface

1714, an output device interface 1706, one or more network interface(s) 1716, and/or subsets and variations thereof.

The bus 1708 collectively represents all system, peripheral, and chipset buses that communicatively connect the numerous internal devices of the electronic system 1700. In one or more implementations, the bus 1708 communicatively connects the one or more processing unit(s) 1712 with the ROM 1710, the system memory 1704, and the permanent storage device 1702. From these various memory units, the one or more processing unit(s) 1712 retrieves instructions to execute and data to process in order to execute the processes of the subject disclosure. The one or more processing unit(s) 1712 can be a single processor or a multi-core processor in different implementations.

The ROM 1710 stores static data and instructions that are utilized by the one or more processing unit(s) 1712 and other modules of the electronic system 1700. The permanent storage device 1702, on the other hand, may be a read-and-write memory device. The permanent storage device 1702 may be a non-volatile memory unit that stores instructions and data even when the electronic system 1700 is off. In one or more implementations, a mass-storage device (such as a magnetic or optical disk and its corresponding disk drive) may be used as the permanent storage device 1702.

In one or more implementations, a removable storage device (such as a floppy disk, flash drive, and its corresponding disk drive) may be used as the permanent storage device 1702. Like the permanent storage device 1702, the system memory 1704 may be a read-and-write memory device. However, unlike the permanent storage device 1702, the system memory 1704 may be a volatile read-and-write memory, such as random access memory (RAM). The system memory 1704 may store one or more of the instructions and/or data that the one or more processing unit(s) 1712 may utilize at runtime. In one or more implementations, the processes of the subject disclosure are stored in the system memory 1704, the permanent storage device 1702, and/or the ROM 1710. From these various memory units, the one or more processing unit(s) 1712 retrieve instructions to execute and data to process in order to execute the processes of one or more implementations.

The bus 1708 also connects to the input and output device interfaces 1714 and 1706. The input device interface 1714 enables a user to communicate information and select commands to the electronic system 1700. Input devices that may be used with the input device interface 1714 may include, for example, alphanumeric keyboards and pointing devices (also called "cursor control devices"). The output device interface 1706 may enable, for example, the display of images generated by the electronic system 1700. Output devices that may be used with the output device interface 1706 may include, for example, printers and display devices, such as a liquid crystal display (LCD), a light emitting diode (LED) display, an organic light emitting diode (OLED) display, a flexible display, a flat panel display, a solid state display, a projector, such as a prism projector that may be included in a smart glasses device, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 17, bus 1708 also couples electronic system 1700 to one or more networks (not shown) through one or more network interface(s) 1716. The one or more network interface(s) may include an Ethernet interface, a WiFi interface, a Bluetooth interface, a Zigbee interface, a multimedia over coax alliance (MoCA) interface, a reduced gigabit media independent interface (RGMII), or generally any interface for connecting to a network. In this manner, electronic system 1700 can be a part of one or more networks of computers (such as a local area network (LAN), a wide area network (WAN), or an Intranet, or a network of networks, such as the Internet. Any or all components of electronic system 1700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
transmitting a first type of data traffic addressed to a first optical network unit (ONU) to a passive optical network over a common port;
pre-empting transmission of the first type of data traffic addressed to the first ONU over the passive optical network in response to detecting a presence of a second type of data traffic addressed to a second ONU, the second ONU being distinct from the first ONU, or in response to receiving a first request to hold the first type of data traffic;
transmitting the second type of data traffic addressed to the second ONU to the passive optical network over the common port; and
resuming the transmission of the first type of data traffic addressed to the first ONU to the passive optical network over the common port upon completion of transmitting the second type of data traffic addressed to the second ONU, or responsive to receiving a second request to release the hold of the first type of data traffic.

2. The method of claim 1, wherein the first type of data traffic comprises non-critical data traffic and the second type of data traffic comprises express data traffic.

3. The method of claim 1, wherein a first portion of a frame of the first type of data traffic is transmitted prior to pre-empting the transmission of the first type of data traffic and a remaining portion of the frame of the first type of data traffic is transmitted upon resuming the transmission of the first type of data traffic.

4. The method of claim 1, further comprising:
suspending transmission of a frame of the first type of data traffic at an end of a first grant and resuming transmission of the frame of the first type of data traffic at a beginning of a next grant.

5. The method of claim 1, wherein the passive optical network comprises an Ethernet passive optical network.

6. The method of claim 1, further comprising:
pre-empting the transmission of the first type of data traffic responsive to receiving the first request to hold the first type of data traffic.

7. The method of claim 6, further comprising:
resuming the transmission of the first type of data traffic over the passive optical network responsive to receiving the second request to release the hold of the first type of data traffic.

8. The method of claim 1, wherein the first type of data traffic is associated with a first logical link identifier and the second type of data traffic is associated with a second logical link identifier.

9. The method of claim 1, further comprising:
sending a report packet after pre-empting the transmission of the first type of data traffic.

10. A device comprising:
a first media access control (MAC) module configured to receive a first type of data traffic and transmit the first type of data traffic to a MAC merge module;
a second MAC module configured to receive a second type of data traffic and transmit the second type of data traffic to the MAC merge module;
a multipoint MAC control module configured to provide an indication to the MAC merge module when transmission of the first type of data traffic should be pre-empted in favor of the second type of data traffic; and
the MAC merge module configured to receive the first and second types of data traffic from the first and second MAC modules, respectively, and provide the first and second types of data traffic for transmission over a port to a passive optical network, wherein the MAC merge module is configured to pre-empt the transmission of the first type of data traffic over the port in response to receiving the indication from the multipoint MAC control module.

11. The device of claim 10, wherein the multipoint MAC control module is further configured to:
transmit a hold request to the MAC merge module; and
transmit a release request to the MAC merge module.

12. The device of claim 11, wherein the multipoint MAC control module is further configured to:
transmit the hold request in response to receiving the hold request from a MAC client; and
transmit the release request in response to receiving the release request from the MAC client.

13. The device of claim 11, wherein the multipoint MAC control module is further configured to:
anticipate the second type of data traffic and a duration of the second type of data traffic;
transmit the hold request to the MAC merge module in response to anticipating the second type of data traffic;
determine when the duration of the second type of data traffic has expired; and
transmit the release request to the MAC merge module in response to determining that the duration has expired.

14. The device of claim 11, wherein the MAC merge module is configured to:
stop acceptance of the first type of data traffic from the first MAC module upon receiving the hold request from the multipoint MAC control module; and
resume the acceptance of the first type of data traffic from the first MAC module upon receiving the release request from the multipoint MAC control module.

15. The device of claim 14, wherein the MAC merge module is configured to:
transmit a first portion of a frame of the first type of data traffic over the port prior to stopping the acceptance of the first type of data traffic; and
transmit a remaining portion of the frame of the first type of data traffic over the port after resuming the acceptance of the first type of data traffic.

16. The device of claim 11, wherein the first and second MAC modules are associated with a first logical link identifier and further comprising:
a third MAC module configured to receive the first type of data traffic and transmit the first type of data traffic to another MAC merge module, wherein the third MAC module is associated with a second logical link identifier; and
the another MAC merge module is configured to receive the hold request from the multipoint MAC control module and stop accepting the first type of data traffic from the third MAC module in response to receiving the hold request.

17. The device of claim 10, wherein the first type of data traffic comprises non-critical data traffic and the second type of data traffic comprises express data traffic.

18. A computer program product comprising instructions stored in a non-transitory computer-readable storage medium, the instructions being executable by a controller, the instructions comprising:
instructions to cause an optical line terminal (OLT) to transmit a burst comprising a plurality of forward error correction codewords including a portion of a plurality of frames during a first time period;
instructions to cause the OLT to suspend transmission of one of the plurality of frames at an end of the first time period, a beginning portion of the one of the plurality of frames being transmitted in one of the plurality of forward error correction codewords, and
instructions to cause the OLT to resume transmission of the one of the plurality of frames at a beginning of a next burst, the next burst comprising another forward error correction codeword that includes a remaining portion of the one of the plurality of frames.

19. The computer program product of claim 18, the instructions further comprising:
instructions to cause the OLT to suspend the transmission of the one of the plurality of frames at the end of the first time period in response to detecting express data traffic.

20. The computer program product of claim 19, wherein detecting the express data traffic comprises receiving an indication of the express data traffic from a multipoint MAC control module.

* * * * *